(12) United States Patent
Sugiyama

(10) Patent No.: US 8,073,147 B2
(45) Date of Patent: Dec. 6, 2011

(54) DEREVERBERATION METHOD, APPARATUS, AND PROGRAM FOR DEREVERBERATION

(75) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 875 days.

(21) Appl. No.: 12/084,968

(22) PCT Filed: Nov. 10, 2006

(86) PCT No.: PCT/JP2006/322444
§ 371 (c)(1),
(2), (4) Date: May 14, 2008

(87) PCT Pub. No.: WO2007/058121
PCT Pub. Date: May 24, 2007

(65) Prior Publication Data
US 2010/0211382 A1    Aug. 19, 2010

(30) Foreign Application Priority Data
Nov. 15, 2005   (JP) ................................. 2005-329737

(51) Int. Cl.
*H04B 3/20*   (2006.01)

(52) U.S. Cl. .......... 381/66; 381/94.1; 381/94.2; 381/63; 381/61; 379/406.01; 370/286

(58) Field of Classification Search ................... 381/66, 381/94.2, 63
See application file for complete search history.

(56) References Cited

U.S. PATENT DOCUMENTS

2003/0076947 A1* 4/2003 Furuta et al. ............. 379/406.01
2004/0049383 A1   3/2004 Kato et al.

FOREIGN PATENT DOCUMENTS

| JP | 2002-204175 A | 7/2002 |
| JP | 2003-131689 A | 5/2003 |
| JP | 2003-140700 A | 5/2003 |

* cited by examiner

*Primary Examiner* — Stephen W Smoot
*Assistant Examiner* — Khaja Ahmad
(74) *Attorney, Agent, or Firm* — Foley & Lardner LLP

(57) ABSTRACT

A dereverberation device includes a reverberation estimation unit for estimating a later reflection component by using information on an impulse response from a signal source to an observation point, a noise estimation unit, and a mixing unit. As a result, it is possible to obtain a high-quality dereverberated signal with a small calculation amount even in a noisy environment.

14 Claims, 17 Drawing Sheets

DEREVERBERATION METHOD, APPARATUS, AND PROGRAM FOR DEREVERBERATION

This application is the National Phase of PCT/JP2006/322444, filed Nov. 10, 2006, which claims priority to Japanese Application No. 2005-329737, filed Nov. 15, 2005, the disclosures of which are hereby incorporated by reference in their entirety.

TECHNICAL FIELD

The present invention relates to dereverberation method, apparatus, and a program for dereverberation, for suppressing reverberation superposed over desired signals.

BACKGROUND ART

A dereverberation system is a system for suppressing reverberation superposed over desired voice signals. Reverberation is generated by convolution of an original signal with an impulse response from a signal source to an observation point. Therefore, in general, dereverberation is achieved by convoluting a signal over which reverberation is superposed, with an inverse property of the impulse response. Since the impulse response or its inverse property is unknown, however, the problem is how to determine it. One method for dereverberation by determining the inverse property of the impulse response and convoluting it with a signal containing reverberation is disclosed in Non-patent Document 1.

In the method disclosed, input voice containing reverberation is first subjected to linear prediction analysis to remove correlation between adjacent samples. Next, the correlation-removed signal is filtered with a filter whose coefficients are updated using a least mean squares (LMS) algorithm, etc. so that the kurtosis of the output thereof is maximized. The thus-obtained filter coefficients are employed as the inverse property of the impulse response to be convolved with the input voice containing reverberation, thus conducting dereverberation. While this method is originally applied to input signals at a plurality of different spatial positions, Non-patent Document 2 discloses application thereof to one input signal.

To compensate for deterioration in performance because of nonuse of signals at a plurality of spatially different positions, dereverberation is conducted in a two-stage configuration including first and second stages. At the first stage, an inverse property of an impulse response is determined by the method as disclosed in Non-patent Document 1, and it is convoluted with input voice containing reverberation to thereby suppress earlier reflection. Subsequently, at the second stage, later reflection is suppressed in a configuration similar to noise suppression. Specifically, a later reflection component contained in an output at the first stage is estimated, and it is subtracted from the output of the first stage to suppress the later reflection component. A block diagram of the method disclosed in Non-patent Document 2 is shown in FIG. 20. The dereverberation method disclosed in Non-patent Document 2 will be described hereinbelow with reference to FIG. 20.

A signal containing reverberation, i.e., degraded voice, supplied to an input terminal 1 is supplied to a linear prediction (LP) analyzing section 3 to remove correlation between adjacent samples. The resulting linear predicted error is transferred to an inverse filter 4 to determine convolution thereof with the filter coefficients, and the result is supplied to a coefficient updating section 5. The coefficient updating section 5 determines coefficient updating components using an LMS algorithm, etc. so that the kurtosis of the output of the inverse filter 4 is maximized. The coefficient updating components are fed back to the inverse filter 4, and are used to perform coefficient updating. By repeating such coefficient update, the property of the inverse filter 4 is ultimately equal to the inverse property of the impulse response from a signal source to an observation point. On the other hand, the property of the inverse filter 4 has been successively copied to the inverse filter 2, and convolution thereof with the degraded voice supplied to the input terminal 1 is calculated. The result of the convolution is the output of the aforementioned first stage. The coefficient update for the inverse filter 4 may be achieved using, in addition to the LMS algorithm, a normalized LMS (NLMS) algorithm, an LS algorithm, an affine projection algorithm, etc. Moreover, the inverse filter 4 and the coefficient updating section 5 may be configured using a frequency domain algorithm or a sub-band algorithm as disclosed in Non-patent Document 3.

At a second stage, a frame dividing section 6 divides the signal supplied from the inverse filter 2 at the first stage into frames each having a specific number of samples, and transfers them to a window processing section 7. The window processing section 7 multiplies the signal divided into frames by a window function, and transfers the result to a Fourier transform section 8. The window function used in the window processing has a property such that a frame edge is suppressed more than a frame center to allow smooth transition to an adjacent frame. The windowed signal is decomposed into a plurality of frequency components at the Fourier transform section 8, and further separated into a amplitude and a phase. The Fourier transform section 8 applies Fourier transform to the windowed signal to divide it into a plurality of frequency components, squares the amplitude value to obtain a power, and supplies it to a reverberation estimating section 111. The phase is supplied to an inverse Fourier transform section 15. The reverberation estimating section 111 uses a Rayleigh distribution function to estimate a current power of reverberation from the past power of degraded voice. The estimated power of reverberation is subtracted from the power of the windowed signal at a subtractor 141 to thereby achieve later reflection component removal. The result of the subtraction is transferred to a selecting section 121.

On the other hand, the power of the windowed signal is also supplied to a constant multiplier 20, where it is multiplied by a factor $\epsilon$, and supplied to the selecting section 121. The selecting section 121 selects a larger one of the output of the subtractor 141 and that of the constant multiplier 20, and transmits the selected one to a silent gap decay section 19. The operation of the selecting section 121 thus causes the minimum value of the result of the subtraction to be limited to the windowed signal multiplied by $\epsilon$, thus preventing excessive dereverberation. The silent gap decay section 19 detects a silent segment between voiced segments, and forcibly decays the power to a predetermined small value. This operation prevents a silent gap from being filled with reverberation. The output of the silent gap decay section 19 is supplied to the inverse Fourier transform section 15. The inverse Fourier transform section 15 combines a square root of the power of the dereverberated voice supplied from the silent gap decay section 19 and the phase of the reverberated voice supplied from the Fourier transform section 8, performs inverse Fourier transform thereon, and supplies the result to a frame synthesis section 17 as dereverberated voice signal samples. The frame synthesis section 17 uses the dereverberated voice samples in an adjacent frame to be synthesized with output voice samples in the current frame, and outputs the result to an output terminal 18.

Non-patent Document 1: IEEE Proceedings of International Conference on Acoustics, Speech, and Signal Processing, pp. 3701-3704 (May 2001).

Non-patent Document 2: IEEE Proceedings of International Conference on Acoustics, Speech, and Signal Processing, pp. 1085-1088 (March 2005).

Non-patent Document 3: IEEE Signal Processing Magazine, pp. 15-36 (January 1992).

DISCLOSURE OF THE INVENTION

Problems to be Solved by the Invention

The reverberation estimating section 111 uses a Rayleigh distribution function to estimate a power of reverberation from the past power of degraded voice. Specifically, an envelope of an impulse response from a signal source to an observation point is approximated with the Rayleigh distribution function to estimate a later reflection component by convolution of the envelope and past degraded voice. However, since the reverberation estimating section 111 optimizes only its scaling factor, the Rayleigh distribution function cannot approximate the envelope of the impulse response with sufficient precision, thus hampering dereverberation with high sound quality.

Moreover, although the second stage for suppressing later reflection has a configuration equivalent to that of the noise suppressing apparatus, it has no noise suppressing function. Thus, in an environment containing reverberation and a noise together, additional and independent noise suppression must be applied in post-processing, leading to a problem that the amount of computation is increased as a whole.

The present invention has been made in view of such problems, and its object is to provide dereverberation method, apparatus and a program capable of producing dereverberated signals with a reduced amount of computation and with high quality even in an environment containing a noise.

The 1st invention for solving the above-mentioned problems is a dereverberation method characterized in that said method comprises: converting an input signal into a frequency-domain signal; estimating a noise using said frequency-domain signal; estimating reverberation using an impulse response from a signal source to an observation point, and past enhanced voice; obtaining a mixed signal by mixing said estimated noise and said estimated reverberation; determining a suppressing factor using said mixed signal and said frequency-domain signal; and performing dereverberation by weighting said frequency-domain signal with said suppressing factor.

The 2nd invention for solving the above-mentioned problems is characterized in that, in the 1st invention, the reverberation is estimated by using, in place of said past enhanced voice, said estimated reverberation in which an effect of said estimated noise is removed, and said frequency-domain signal.

The 3rd invention for solving the above-mentioned problems is characterized in that, in the 1st or 2nd inventions, said suppressing factor is obtained by integrating bands of said frequency-domain signal to obtain an integrated frequency-domain signal, and using said integrated frequency-domain signal in place of said frequency-domain signal.

The 4th invention for solving the above-mentioned problems is characterized in, in any one of the 1st to the 3rd inventions, comprising: removing correlation between input signal samples to obtain a correlation-removed signal; processing said correlation-removed signal with an adaptive filter to obtain a provisionary early reflection-suppressed signal; updating coefficients of said adaptive filter so that kurtosis of said provisionary early reflection-suppressed signal is maximized; processing said input signal with a fixed filter having the same coefficients as those of said adaptive filter to obtain an early reflection-removed signal; determining said impulse response using the coefficients of said adaptive filter; and employing said early reflection-suppressed signal as said input signal.

The 5th invention for solving the above-mentioned problems is characterized in, in any one of the 1st to the 3rd inventions, comprising: processing a reference signal with a first adaptive filter to obtain a pseudo-noise; subtracting said pseudo-noise from an input signal to obtain a noise-cancelled signal; updating coefficients of said first adaptive filter using said noise-removed signal and said reference signal so that said noise-removed signal is minimized; obtaining said impulse response using the coefficients of said first adaptive filter; and employing said noise-removed signal as said input signal.

The 6th invention for solving the above-mentioned problems is characterized in, in any one of the 1st to the 3rd inventions, comprising: removing correlation between samples of said noise-removed signal to obtain a correlation-removed signal; processing said correlation-removed signal with a second adaptive filter to obtain a provisionary early reflection-suppressed signal; updating coefficients of said second adaptive filter so that kurtosis of said provisionary early reflection-suppressed signal is maximized; processing said input signal with a fixed filter having the same coefficients as those of said second adaptive filter to obtain an early reflection-removed signal; obtaining said impulse response using the coefficients of said first adaptive filter; and employing said early reflection-suppressed signal as said input signal.

The 7th invention for solving the above-mentioned problems is a dereverberation apparatus characterized in that said apparatus comprises: a converting section for converting an input signal into a frequency-domain signal; a noise estimating section for obtaining an estimated noise using said frequency-domain signal; a reverberation estimating section for estimating reverberation using an impulse response from a signal source to an observation point, and past enhanced voice; a mixing section for mixing said estimated noise and said estimated reverberation to obtain a mixed signal; a suppressing factor generating section for determining a suppressing factor using said mixed signal and said frequency-domain signal; and a multiplying section for weighting said frequency-domain signal with said suppressing factor.

The 8th invention for solving the above-mentioned problems is characterized in that, in the 7th invention, said apparatus comprises a reverberation estimating section for estimating reverberation using, in place of said past enhanced voice, said estimated reverberation in which an effect of said estimated noise is removed, and said frequency-domain signal.

The 9th invention for solving the above-mentioned problems is characterized in that, in the 7th or the 8th inventions, said apparatus comprises a band integrating section for integrating bands of said frequency-domain signal to obtain an integrated frequency-domain signal, and said suppressing factor is obtained by using said integrated frequency-domain signal in place of said frequency-domain signal.

The 10th invention for solving the above-mentioned problems is characterized in that, in any one of the 7th to the 9th inventions, said apparatus comprises: a correlation-removing section for removing correlation between input signal samples to obtain a correlation-removed signal; an adaptive filter for processing said correlation-removed signal to obtain a provisionary early reflection-suppressed signal; a fixed filter for processing said input signal with the same coefficients as those of said adaptive filter to obtain an early reflection-removed signal; and a reverberation estimating section for obtaining said impulse response using the coefficients of said adaptive filter, and the coefficients of said adaptive filter are updated so that kurtosis of said provisionary early reflection-suppressed signal is maximized, and said early reflection-suppressed signal is employed as said input signal.

The 11th invention for solving the above-mentioned problems is characterized in that, in any one of the 7th to the 9th inventions, said apparatus comprises: a first adaptive filter for processing a reference signal to obtain a pseudo-noise; a subtractor for subtracting said pseudo-noise from an input signal to obtain a noise-cancelled signal; and a reverberation estimating section for obtaining said impulse response using coefficients of said first adaptive filter, and the coefficients of said first adaptive filter are updated using said noise-removed signal and said reference signal so that said noise-removed signal is minimized, and said noise-removed signal is employed as said input signal.

The 12th invention for solving the above-mentioned problems is characterized in that, in the 11th invention, said apparatus comprises: a correlation-removing section for removing correlation between samples of said noise-removed signal to obtain a correlation-removed signal; a second adaptive filter for processing said correlation-removed signal to obtain a provisionary early reflection-suppressed signal; a fixed filter for processing said input signal with the same coefficients as those of said second adaptive filter to obtain an early reflection-removed signal; and a reverberation estimating section for obtaining said impulse response using the coefficients of said first adaptive filter, and the coefficients of said second adaptive filter are updated so that kurtosis of said provisionary early reflection-suppressed signal is maximized, and said early reflection-suppressed signal is employed as said input signal.

The 13th invention for solving the above-mentioned problems is characterized in that a program for dereverberation for causing a computer to execute the processing of: converting an input signal into a frequency-domain signal; estimating a noise using said frequency-domain signal; estimating reverberation using an impulse response from a signal source to an observation point, and past enhanced voice; mixing said estimated noise and said estimated reverberation to obtain a mixed signal; determining a suppressing factor using said mixed signal and said frequency-domain signal; and weighting said frequency-domain signal with said suppressing factor.

The 14th invention for solving the above-mentioned problems is characterized in that a program for dereverberation for causing a computer to execute the processing of: converting an input signal into a frequency-domain signal; estimating a noise using said frequency-domain signal; estimating reverberation using an impulse response from a signal source to an observation point, said estimated reverberation in which an effect of said estimated noise is removed, and said frequency-domain signal; mixing said estimated noise and said estimated reverberation to obtain a mixed signal; determining a suppressing factor using said mixed signal and said frequency-domain signal; and weighting said frequency-domain signal with said suppressing factor.

Specifically, the dereverberation method and apparatus of the present invention are characterized in appropriately mixing a later reflection component signal source to an observation point with a noise estimated using an input signal, and then suppressing them in the input signal.

More particularly, the present invention is characterized in comprising: a reverberation estimating section for estimating a later reflection component using information on an impulse response from a signal source to an observation point; a noise estimating section for estimating a noise using an input signal; and a mixing section for mixing the estimated reverberation with the estimated noise.

Effects of the Invention

According to the present invention, since a later reflection component is estimated using information on an impulse response from a signal source to an observation point, a noise is estimated using an input signal, and they are appropriately mixed and then suppressed, high quality dereverberation and noise suppression can be simultaneously achieved with a reduced amount of computation.

Figure 1:
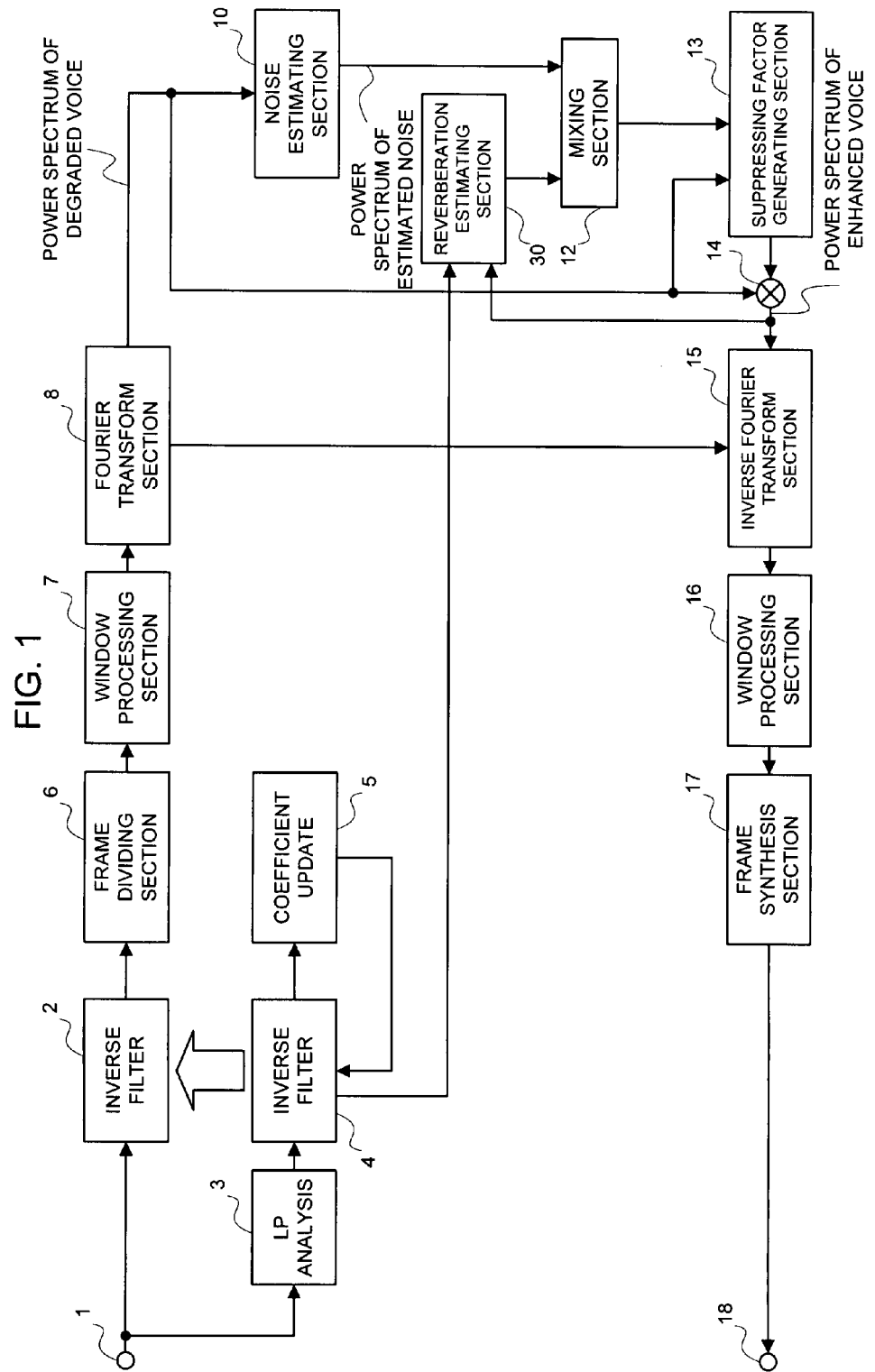
FIG. 1 A block diagram showing a first embodiment of the present invention.

EXPLANATION OF SYMBOLS 1, 25 Input terminals
2, 4 Inverse filters
3 LP analyzing section
5 Coefficient updating section
6 Frame dividing section
7, 16 Window processing sections
8 Fourier transform section
9 Band integrating section
10 Noise estimating section
12 Mixing section
13 Suppressing factor generating section
14, 313, 1324, 1325, 1391, 1293, 1357 Multipliers
15 Inverse Fourier transform section
17 Frame synthesis section
18 Output terminal
19 Silent gap decay section
20, 1395 Constant multipliers
26 Adaptive filter
27, 1015, 1328, 1392, 1394 Adders
30, 31, 32, 40, 111 Reverberation estimating sections
101 Estimated noise calculating section
102 Weighted degraded voice calculating section
103, 1018 Counters
104 Estimated noise correcting section
121 Selecting section
131, 1022 Frequency-indexed SNR calculating sections
132 Estimated prior SNR calculating section
133, 1333 Suppressing factor calculating sections
134 Voice non-existence probability storage section
135 Suppressing factor correcting section
141, 311 Subtractors
200 Noise canceller
312 Exponential function calculating section
921 Instantaneous estimated SNR
922 Past estimated SNR
923 Weight
924 Estimated prior SNR
1000 Computer
1010 Update deciding section
1011 Register length storage section
1012, 1021 Estimated noise storage sections
1013, 1355 Switches
1014 Shift register
1016 Minimum value selecting section
1017 Dividing section
1024 Multiple non-linear processing section
1101 Logical sum calculating section
1102, 1104, 1354 Comparator sections
1103, 1105, 1353 Threshold storage sections
1106 Threshold calculating section
1321 Multiple limited-range processing section
1322 Posterior SNR storage section
1323 Suppressing factor storage section
1326 Weight storage section
1327 Multiple weighted adding section
1331 MMSE STSA gain function value calculating section
1332 Generalized likelihood ratio calculating section
1351 Maximum value selecting section
1352 Suppressing factor lower limit value storage section
1356 Modifying value storage section

BEST MODES FOR CARRYING OUT THE INVENTION

Figure 20:
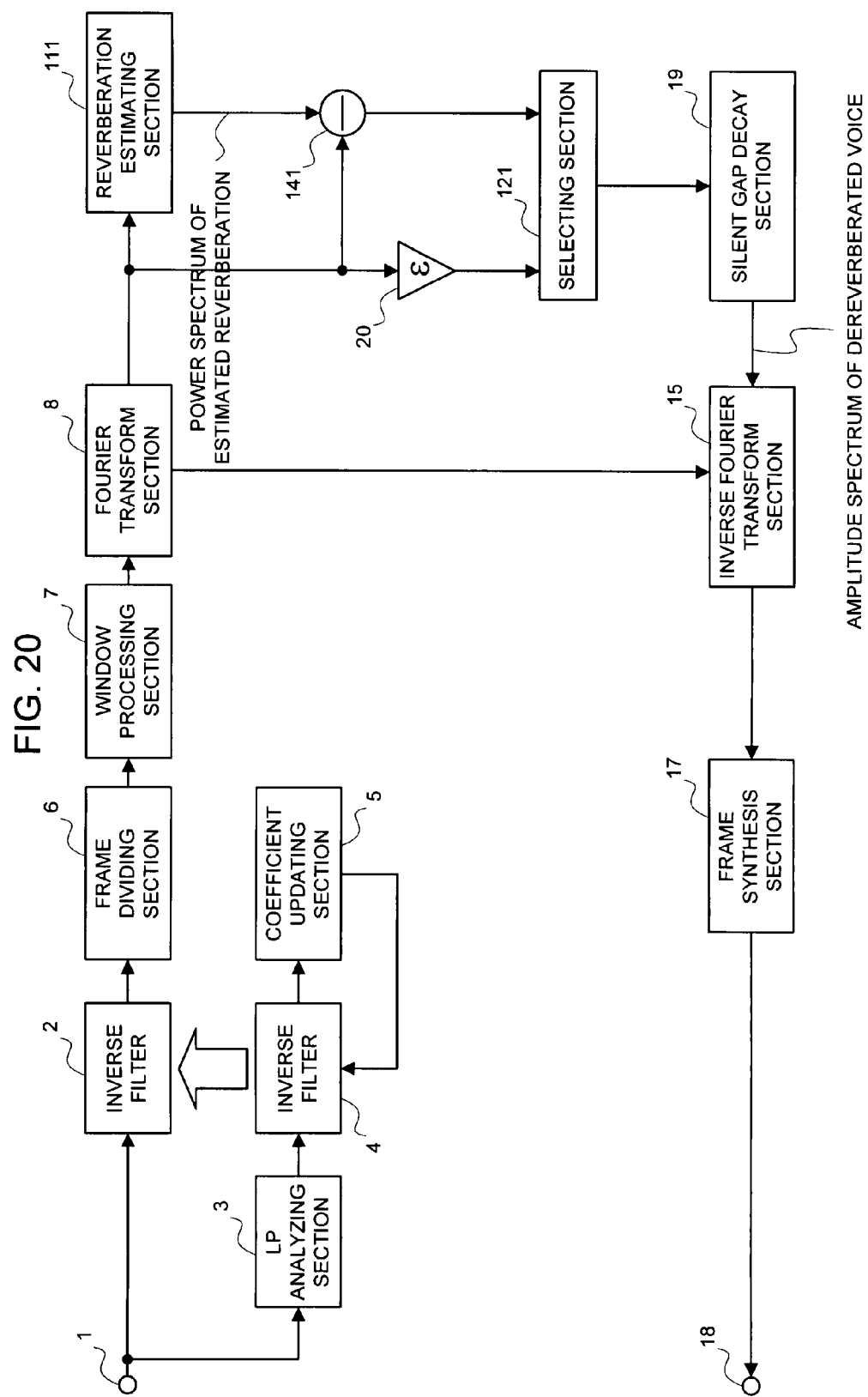
FIG. 20 A block diagram showing an exemplary configuration of a conventional dereverberation apparatus.

FIG. 1 is a block diagram showing the best embodiment of the present invention. FIG. 1 has a configuration in which the reverberation estimating section 111, the subtractor 141, the constant multiplier 20, the selecting section 121, and the silent gap decay section 19 in the conventional configuration in FIG. 20 are replaced with a noise estimating section 10, a reverberation estimating section 30, a mixing section 12, a suppressing factor generating section 13, and a multiplier 14. An operation will now be described in detail referring to these differences.

The noise estimating section 10 estimates a noise for each of a plurality of frequency components supplied from the Fourier transform section 8, and transfers it to the mixing section 12. An exemplary noise estimation scheme involves weighting degraded voice with a past signal-to-noise ratio to obtain a noise component, details of which is described in Patent Document 1 (JP-P2002-204175A), for example.

The reverberation estimating section 30 determines a property of the tail of an impulse response representing later reflection, and convolves it with a past dereverberated signal supplied from the multiplier 14 to thereby estimate current reverberation. The reverberation estimating section 30 is supplied with information on filter coefficients from the inverse filter 4, which are used to estimate the later reflection component. The inverse property of the inverse filter 4 determined using the filter coefficients supplied from the inverse filter 4 represents an impulse response from a signal source to an observation point. Since the tail of the impulse response induces later reflection, coefficient values in the tail can be used to estimate a reverberation component. Moreover, it is well known that the tail of an impulse response in an in-room acoustic space can be approximated by exponential decay function, and therefore, an exponential function that approximates the tail can be obtained to employ its sample values, instead of employing the obtained coefficient values of an impulse response as are. Since the coefficient values in the tail are assured to exponentially decay, a local computational error that may potentially occur in computation in the inverse filter 4 can be avoided and accurate reverberation can be estimated. An exponential function approximating the tail can be obtained by taking a logarithm of the sample values in the tail, approximating these sample values to a straight line in a logarithmic domain, and using the gradient of the resulting straight line as an exponent. Moreover, since a unique exponential function can be determined by two points at the minimum, the number of the coefficients employed in the aforementioned process may be any value of two or more. Furthermore, to avoid an effect of slight variation of the coefficient values brought about by coefficient update in the inverse filter, the coefficients supplied from the inverse filter may be averaged and then employed in exponential function determination. The averaging is also effective in the aforementioned embodiment in estimating reverberation directly using coefficient values without using an exponential function.

The thus-estimated reverberation is transferred to the mixing section 12. The mixing section 12 mixes the supplied estimated noise and estimated reverberation, and transfers the result to the suppressing factor generating section 13. The simplest one of several kinds of processing for mixing the estimated noise and estimated reverberation involves selecting either the estimated noise or reverberation. The estimated noise and estimated reverberation are compared, and either the estimated noise or reverberation that is larger is supplied to the suppressing factor generating section 13 as an output of the mixing section 12. This means that either the reverberation or noise that is more dominant is preferentially suppressed, thus providing clear voice with a reduced noise and reverberation contained in output signals. On the other hand, either the estimated noise or estimated reverberation that is smaller may be supplied to the suppressing factor generating section 13 as an output of the mixing section 12. In this case, residual reverberation and a noise in output signals are larger than those in the case in which reverberation or a noise that is larger is selected. On the contrary, distortion contained in voice may be kept small. Processing intermediate between these two cases is mixing of an estimated noise and estimated reverberation. In the mixing, they may be added without modification, or added and then normalized so as to provide the same total band power as that of either the noise or reverberation that is larger or provide the same total band power as that of either the noise or reverberation that is smaller, or normalized so as to provide the same total band power as the average of them.

The suppressing factor generating section 13 generates respective suppressing factors for a plurality of frequency components for multiplying an input signal therewith to obtain enhanced voice in which reverberation and a noise are suppressed. An example of suppressing factor generation is a least mean squares short-term spectrum amplitude method, which is commonly used in noise suppression, involving minimizing an expected value of the described in Patent Document 1. While generation of suppressing factors in noise suppression is based on an estimated noise and degraded voice, the suppressing factors according to the present invention are generated based on a mixed signal of estimated reverberation and an estimated noise, and degraded voice.

The frequency-indexed suppressing factors are supplied to the multiplier 14. The multiplier 14 multiplies degraded voice supplied from the Fourier transform section 8 by the suppressing factor supplied from the suppressing factor generating section 13 independently for each frequency, and transfers the resulting product to the inverse Fourier transform section 15 as a power of enhanced voice. The inverse Fourier transform section 15 performs inverse Fourier transformation on the square root of the power of enhanced voice supplied from the multiplier 14 in combination with the phase of degraded voice supplied from the Fourier transform section 8, and supplies the result to the window processing section 16 as enhanced voice signal samples. The window processing section 16 processes the enhanced voice signal samples by a similar operation to that in the window processing section 7, and supplies the result to the frame synthesis section 17. The window processing section 16 contributes to improvement of continuity of signals across a frame border to provide smooth output signals. The frame synthesis section 17 synthesizes output voice samples in the current frame using enhanced voice samples in an adjacent frame, and supplies the result to the output terminal 18.

Figure 2:
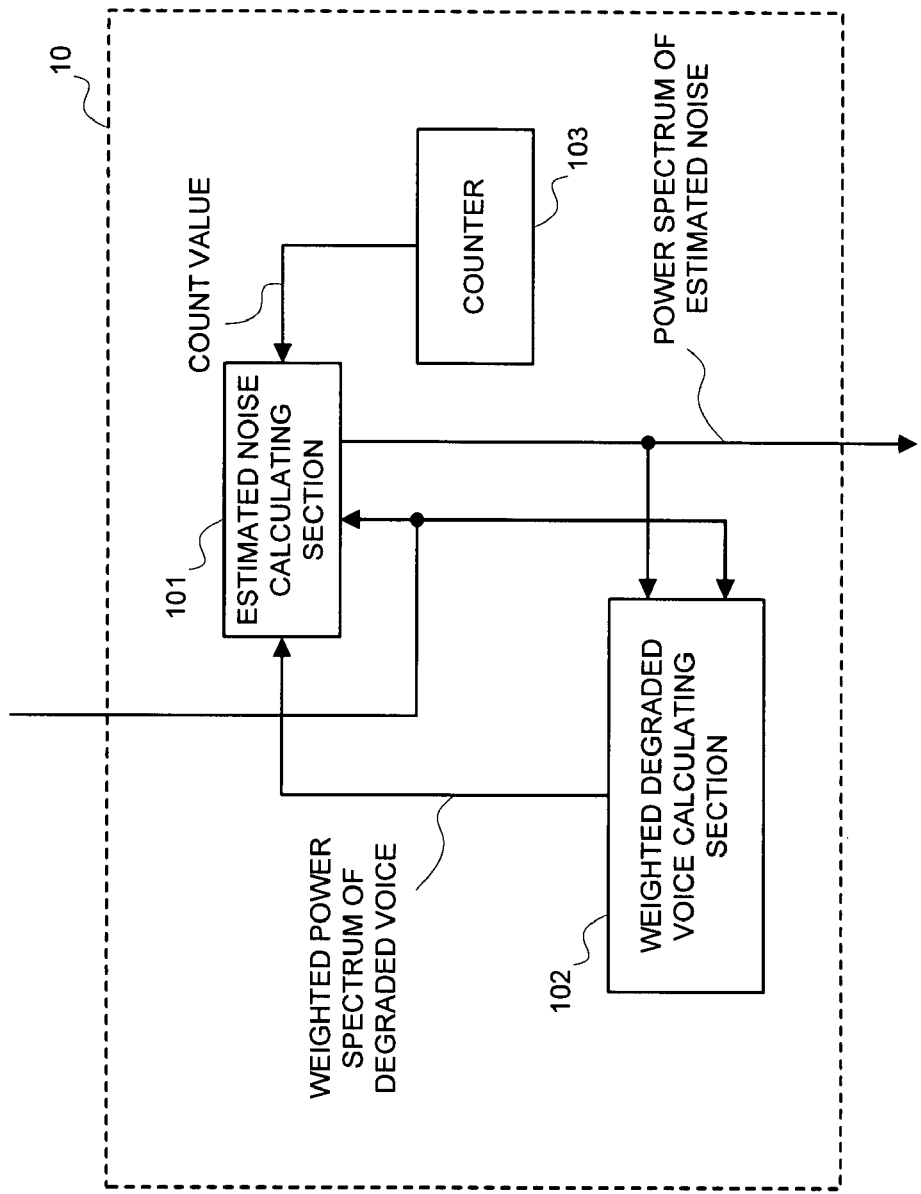
FIG. 2 A block diagram showing a configuration of a noise estimating section contained in the first embodiment of the present invention.

FIG. 2 is a block diagram representing a configuration of the noise estimating section 10 in a scheme described in Patent Document 1. While the following description will be made assuming that the section 10 estimates a noise for convenience of explanation, it actually estimates a mixed signal of a noise and reverberation, in place of a noise. First, degraded voice, which is an input to the noise estimating section 10, is supplied to an estimated noise calculating section 101 and a weighted degraded voice calculating section 102. The weighted degraded voice calculating section 102 uses a power spectrum of the degraded voice to calculate a weighted power spectrum of degraded voice and transfers it to the estimated noise calculating section 101. The estimated noise calculating section 101 uses the power spectrum of degraded voice, weighted power spectrum of degraded voice, and a count value supplied from the counter 103 to estimate a power spectrum of a noise, and outputs it as a power spectrum of an estimated noise.

Figure 3:
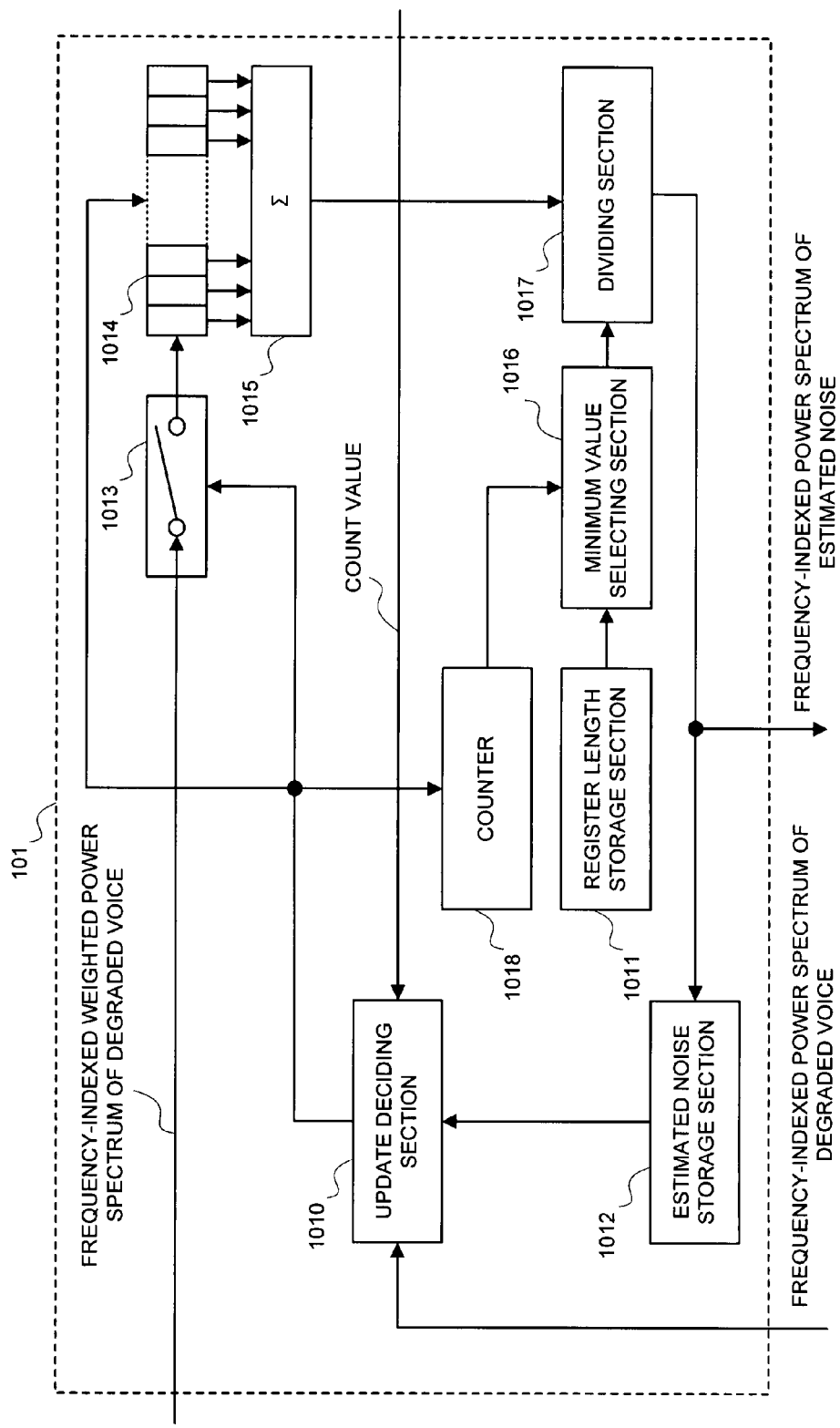
FIG. 3 A block diagram showing a configuration of an estimated noise calculating section contained in FIG. 2.

FIG. 3 is a block diagram showing a configuration of the estimated noise calculating section 101 contained in FIG. 2. The estimated noise calculating section 101 comprises an update deciding section 1010, a register length storage section 1011, an estimated noise storage section 1012, a switch 1013, a shift register 1014, an adder 1015, a minimum value selecting section 1016, a dividing section 1017, and a counter 1018. The switch 1013 is supplied with the frequency-indexed weighted power spectrum of degraded voice from the weighted degraded voice calculating section 102 in FIG. 2. Once the switch 1013 has closed the circuit, the frequency-indexed weighted power spectrum of degraded voice is transferred to the shift register 1014. The shift register 1014 shifts a value stored in its internal registers to adjacent ones according to a control signal supplied from the update deciding section 1010. The length of the shift register is equal to a value stored in the register length storage section 1011, which will be discussed later. The output from all registers in the shift register 1014 is supplied to the adder 1015. The adder 1015 adds up the supplied output from all registers, and transfers the result of addition to the dividing section 1017.

On the other hand, the update deciding section 1010 is supplied with the count value, frequency-indexed power spectrum of degraded voice and frequency-indexed power spectrum of an estimated noise. The update deciding section 1010 always outputs one until the count value reaches a prespecified value, outputs one after the prespecified value is reached and when the input degraded voice signal is decided to be a noise, otherwise zero, and transfers the result to the counter 1018, switch 1013, and shift register 1014. The switch 1013 closes the circuit when the signal supplied from the update deciding section is one, and opens it when zero. The counter 1018 increments the count value when the signal supplied from the update deciding section is one, and makes no change when zero. When the signal supplied from the update deciding section is one, the shift register 1014 takes one of the signal samples supplied from the switch 1013, and at the same time, shifts the stored value in the internal registers to adjacent ones. The minimum value selecting section 1016 is supplied with the output of the counter 1018 and that of the register length storage section 1011.

The minimum value selecting section 1016 selects a smaller one of the supplied count value and register length, and transfers the result to the dividing section 1017. The dividing section 1017 divides the sum of the frequency-indexed power spectrum of degraded voice supplied from the adder 1015 by the smaller one of the count value and register length, and outputs the quotient as a frequency-indexed power spectrum of an estimated noise $\lambda_n(k)$. Representing a sample value of the power spectrum of degraded voice saved in the shift register 1014 as $B_n(k)$ (n=0, 1, ..., N−1), $\lambda_n(k)$ is given as:

$$\lambda_n(k) = \frac{1}{N} \sum_{n=0}^{N-1} B_n(k) \qquad \text{[Equation 1]}$$

where k designates a frequency index, N is a smaller one of the count value and register length. Since the count value monotonically increases starting with zero, division is first made with the count value, and later, with the register length. Division with the register length implies calculation of an average value of the values stored in the shift register. In the first place, an insufficient number of values are stored in the shift register 1014, so that division is made with the number of registers in which values are actually stored. The number of registers in which values are actually stored is equal to the count value when the count value is smaller than the register length, and equal to the register length when the count value is larger than the register length.

Figure 4:
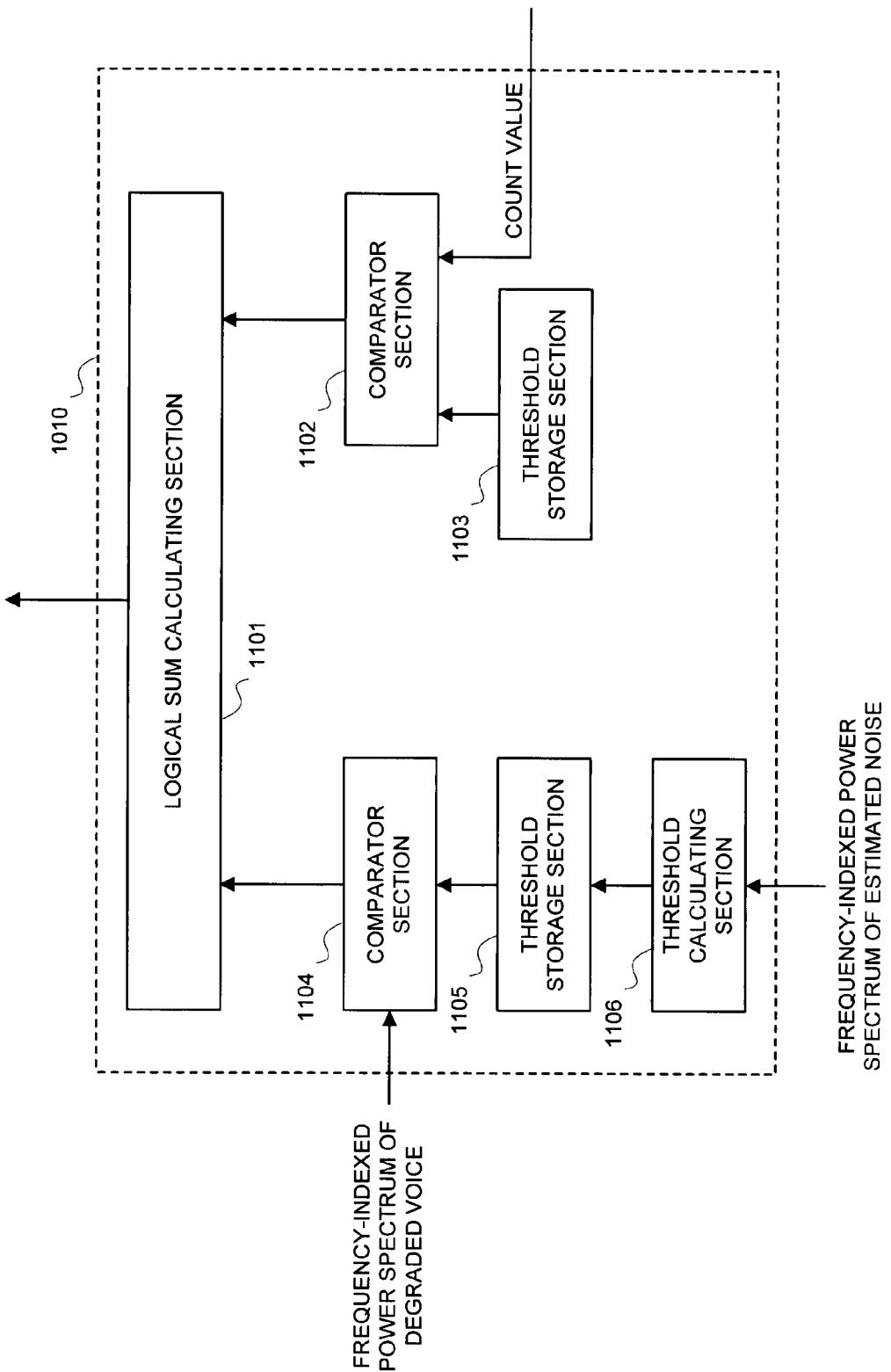
FIG. 4 A block diagram showing a configuration of an update deciding section contained in FIG. 3.

FIG. 4 is a block diagram showing a configuration of the update deciding section 1010 contained in FIG. 3. The update deciding section 1010 comprises a logical sum calculating section 1101, comparator sections 1102, 1104, threshold storage sections 1103, 1105, and a threshold calculating section 1106. The count value supplied from the counter 103 in FIG. 2 is transferred to the comparator section 1102. A threshold, which is an output of the threshold storage section 1103, is also transferred to the comparator section 1102. The comparator section 1102 compares the supplied count value and threshold, and transfers to the logical sum calculating section 1101 one when the count value is smaller than the threshold, and zero when the count value is larger than the threshold. On the other hand, the threshold calculating section 1106 calculates a value corresponding to the frequency-indexed power spectrum of an estimated noise supplied from the estimated noise storage section 1012 in FIG. 3, and outputs the value to the threshold storage section 1105 as a threshold. The simplest method of calculating the threshold involves multiplication of the frequency-indexed power spectrum of an estimated noise by a constant. Besides, it is possible to calculate the threshold using a higher-order polynomial or a non-linear function. The threshold storage section 1105 stores the threshold output from the threshold calculating section 1106, and outputs the threshold stored for a previous frame to the comparator section 1104. The comparator section 1104 compares the threshold supplied from the threshold storage section 1105 with the frequency-indexed power spectrum of degraded voice supplied from the Fourier transform section 8 in FIG. 1, and outputs to the logical sum calculating section 1101 one when the frequency-indexed power spectrum of degraded voice is smaller than the threshold, and zero when it is larger. That is, it decides whether the degraded voice signal is a noise or not according to the magnitude of the power spectrum of an estimated noise. The logical sum calculating section 1101 calculates a logical sum of the output value from the comparator section 1103 and that from the comparator section 1104, and outputs the result of the calculation to the switch 1013, shift register 1014 and counter 1018 in FIG. 3. Thus, the update deciding section 1010 outputs one not only in the initial state and in the silent segment but also when the power of degraded voice is small in a voiced segment. That is, update of an estimated noise is performed. Since calculation of the threshold is independently performed for each frequency, update of the estimated noise can be achieved independently for each frequency.

Figure 5:
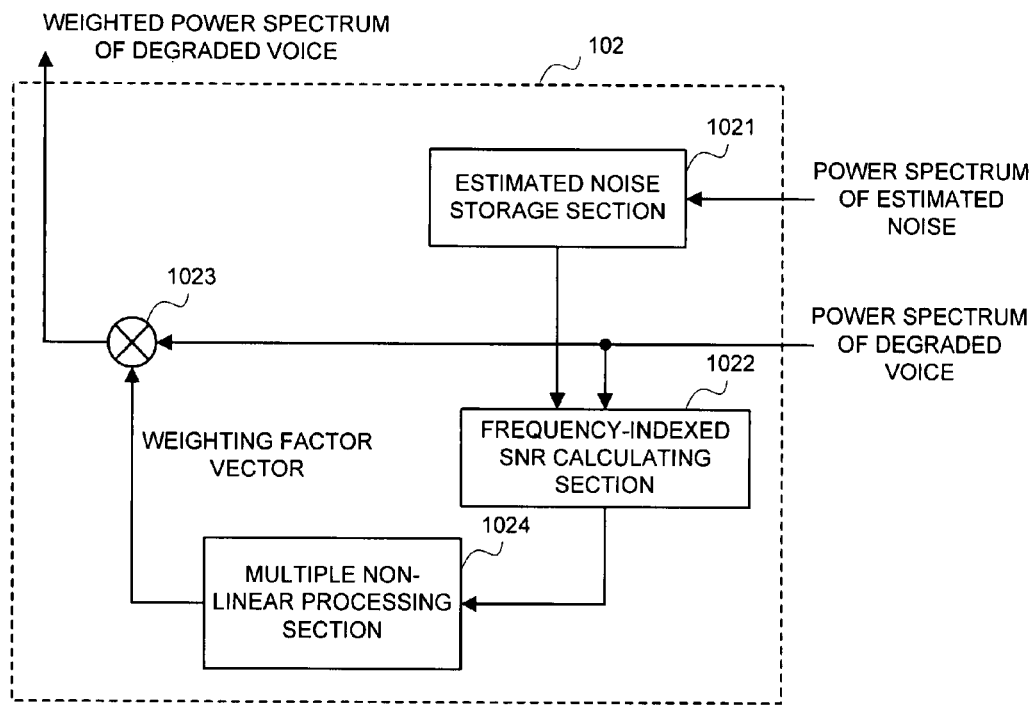
FIG. 5 A block diagram showing a configuration of a weighted degraded voice calculating section contained in FIG. 2.

FIG. 5 is a block diagram showing a configuration of the weighted degraded voice calculating section 102 in FIG. 2. The weighted degraded voice calculating section 102 comprises an estimated noise storage section 1021, a frequency-indexed SNR calculating section 1022, a multiple non-linear processing section 1024, and a multiplier 1023. The estimated noise storage section 1021 stores therein the power spectrum of an estimated noise supplied from the estimated noise calculating section 101 in FIG. 2, and outputs the power spectrum of an estimated noise stored for a previous frame to the frequency-indexed SNR calculating section 1022. The frequency-indexed SNR calculating section 1022 uses the power spectrum of an estimated noise and power spectrum of degraded voice supplied from the estimated noise storage section 1021 to obtain an SNR for each frequency band, and outputs it to the multiple non-linear processing section 1024. In particular, a quotient resulting from division of the latter by the former is obtained for each frequency band as SNR. The multiple non-linear processing section 1024 uses the SNR supplied from the frequency-indexed SNR calculating section 1022 to calculate a weighting factor vector, and outputs the weighting factor vector to the multiplier 1023. The multiple non-linear processing section 1024 comprises a non-linear function that outputs a real value in response to the input value corresponding to each frequency band.

Figure 6:
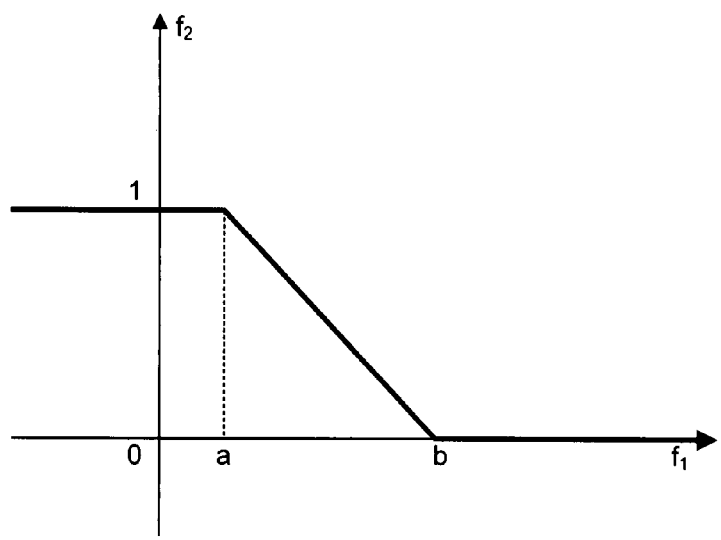
FIG. 6 A diagram showing an example of a non-linear function in a non-linear processing section.

FIG. 6 shows an exemplary non-linear function. Representing an input value as $f_1$, an output value $f_2$ of the non-linear function shown in FIG. 6 is given as:

$$f_2 = \begin{cases} 1, & f_1 \le a \\ \dfrac{f_1 - b}{a - b}, & a < f_1 \le b \\ 0, & b < f_1 \end{cases}$$ [Equation 2]

where a and b represent arbitrary real numbers. The multiple non-linear processing section 1024 process an SNR for each frequency band with the non-linear function to obtain a weighting factor, and transfers it to the multiplier 1023. Specifically, the multiple non-linear processing section 1024 calculates a weighting factor from one to zero corresponding to an SNR for each frequency band, and transfers the result to the multiplier 1023 as a weighting factor vector. When the SNR is small, one is output, and when the SNR is large, zero is output.

The weighting factor multiplied by the power spectrum of degraded voice at the multiplier 1023 has a value corresponding to an SNR, which value is smaller for a larger SNR, i.e., for a greater voice component contained in degraded voice. Although the power spectrum of degraded voice is employed in general for update of an estimated noise, weighting can be applied according to the SNR, in contrast with the power spectrum of degraded voice for use in update of an estimated noise, to thereby reduce an effect of the voice component contained in the power spectrum of degraded voice, thus achieving noise estimation with higher precision. While a case in which a non-linear function is employed in calculating a weighting factor is illustrated, it is possible to employ a function of SNR represented in another form such as a linear function or a higher-order polynomial, in addition to the non-linear function. The multiplier 1023 calculates a product of the power spectrum of degraded voice and weighting factor vector supplied from the multiple non-linear processing section 1024 for each frequency band, and outputs a weighted power spectrum of degraded voice to the estimated noise calculating section 101 in FIG. 2.

Figure 7:
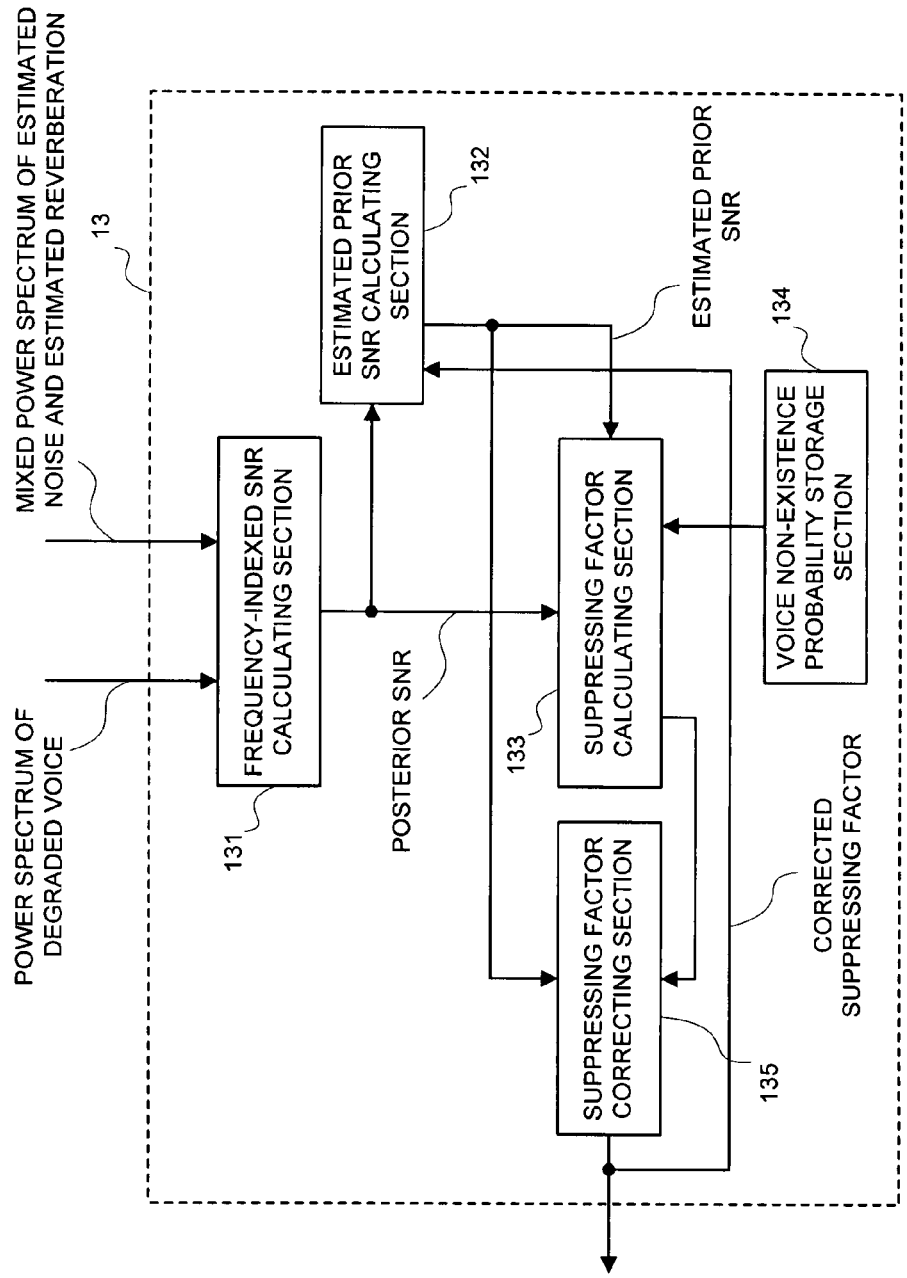
FIG. 7 A block diagram showing a configuration of a suppressing factor generating section contained in FIG. 1.

FIG. 7 is a block diagram showing a configuration of the suppressing factor generating section 13 contained in FIG. 1. The suppressing factor generating section 13 comprises a frequency-indexed SNR calculating section 131, an estimated prior SNR calculating section 132, a noise suppressing factor calculating section 133, a voice non-existence probability storage section 134, and a suppressing factor correcting section 135. The frequency-indexed SNR calculating section 131 uses the power spectrum of degraded voice input by the Fourier transform section 8 in FIG. 1, and a mixed power spectrum of the estimated noise and estimated reverberation input by the mixing section 12 in FIG. 1 to calculate an SNR for each frequency band, and supplies it to the estimated prior SNR calculating section 132 and suppressing factor calculating section 133 as a posterior SNR. The estimated prior SNR calculating section 132 uses the input posterior SNR, and a corrected suppressing factor supplied from the suppressing factor correcting section 135 to estimate a prior SNR, and transfers it to the suppressing factor calculating section 133 as an estimated prior SNR. The suppressing factor calculating section 133 uses the posterior SNR, estimated prior SNR, and a voice non-existence probability supplied from the voice non-existence probability storage section 134, supplied as the inputs, to calculate a suppressing factor and transfers it to the suppressing factor correcting section 135. The suppressing factor correcting section 135 uses the input estimated prior SNR and suppressing factor to correct the suppressing factor, and supplies it to the multiplier 14 in FIG. 1 as a corrected suppressing factor $G_n(k)$-bar.

Figure 8:
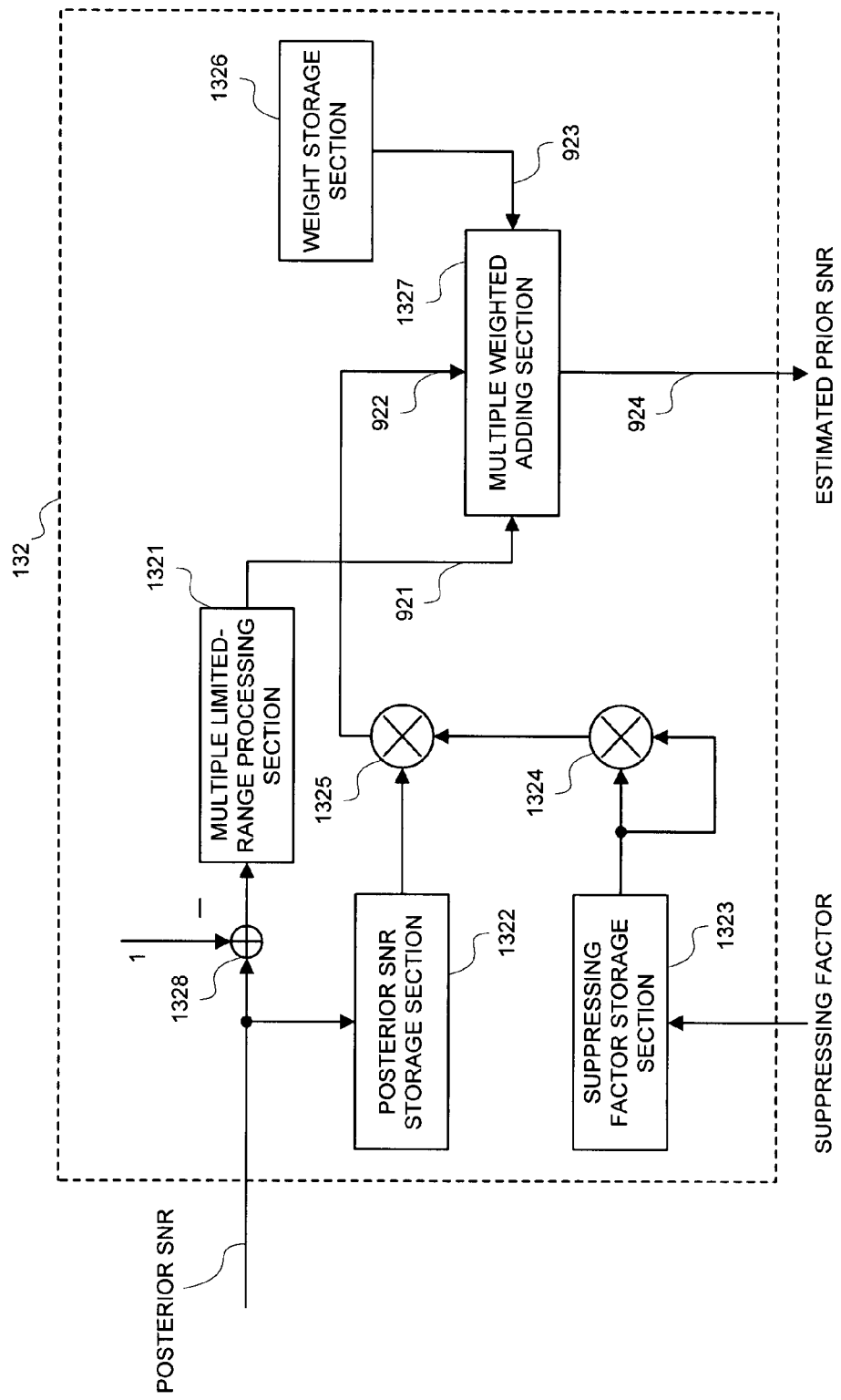
FIG. 8 A block diagram showing a configuration of an estimated prior SNR calculating section contained in FIG. 7.

FIG. 8 is a block diagram showing a configuration of the estimated prior SNR calculating section 132 contained in FIG. 7. The estimated prior SNR calculating section 132 comprises a multiple limited-range processing section 1321, a posterior SNR storage section 1322, a suppressing factor storage section 1323, multipliers 1324, 1325, a weight storage section 1326, a multiple weighted adding section 1327, and an adder 1328. The posterior SNR $\gamma_n(k)$ (k=0, 1, ..., M-1) supplied from the frequency-indexed SNR calculating section 131 in FIG. 7 is transferred to the posterior SNR storage section 1322 and adder 1328. The posterior SNR storage section 1322 stores a posterior SNR $\gamma_n(k)$ in an n-th frame and transfers a posterior SNR $\gamma_{n-1}(k)$ in an (n−1)-th frame to the multiplier 1325. The corrected suppressing factor $G_n(k)$-bar (k=0, 1, ..., M−1) supplied from the suppressing factor correcting section 135 in FIG. 7 is transferred to the suppressing factor storage section 1323. The suppressing factor storage section 1323 stores therein a corrected suppressing factor $G_n(k)$-bar in an n-th frame and transfers a corrected suppressing factor $G_{n-1}(k)$-bar in an (n−1)-th frame to the multiplier 1324. The multiplier 1324 squares the supplied $G_n(k)$-bar to obtain $G^2_{n-1}(k)$-bar, and transfers it to the multiplier 1325. The multiplier 1325 multiplies $G^2_{n-1}(k)$-bar with $\gamma_{n-1}(k)$ for k=0, 1, ..., M−1 to obtain $G^2_{n-1}(k)$-bar $\gamma_{n-1}(k)$, and transfers the result to the multiple weighted adding section 1327 as a past estimated SNR 922.

The other terminal of the adder 1328 is supplied with minus one, and the result of addition $\gamma_n(k)-1$ is transferred to the multiple limited-range processing section 1321. The multiple limited-range processing section 1321 performs an operation by a limited-range operator P[•] on the result of addition $\gamma_n(k)-1$ supplied from the adder 1328, and transfers resulting $P[\gamma_n(k)-1]$ to the multiple weighted adding section 1327 as an instantaneous estimated SNR 921. P[x] is determined by the following equation:

$$P[x] = \begin{cases} x, & x > 0 \\ 0, & x \le 0 \end{cases} \quad \text{[Equation 3]}$$

The multiple weighted adding section 1327 is also supplied with a weight 923 from the weight storage section 1326. The multiple weighted adding section 1327 uses these supplied instantaneous estimated SNR 921, past estimated SNR 922, and weight 923 to obtain an estimated prior SNR 924. Representing the weight 923 as α, and estimated prior SNR as $\xi_n(k)$-hat, $\xi_n(k)$-hat is calculated by the following equation:

$$\xi_n(k) = \alpha \gamma_{n-1}(k) \overline{G}_{n-1}^2(k) + (1-\alpha) P[\gamma_n(k)-1] \quad \text{[Equation 4]}$$

where $G^2_{-1}(k) \gamma_{-1}(k)$-bar=1.

Figure 9:
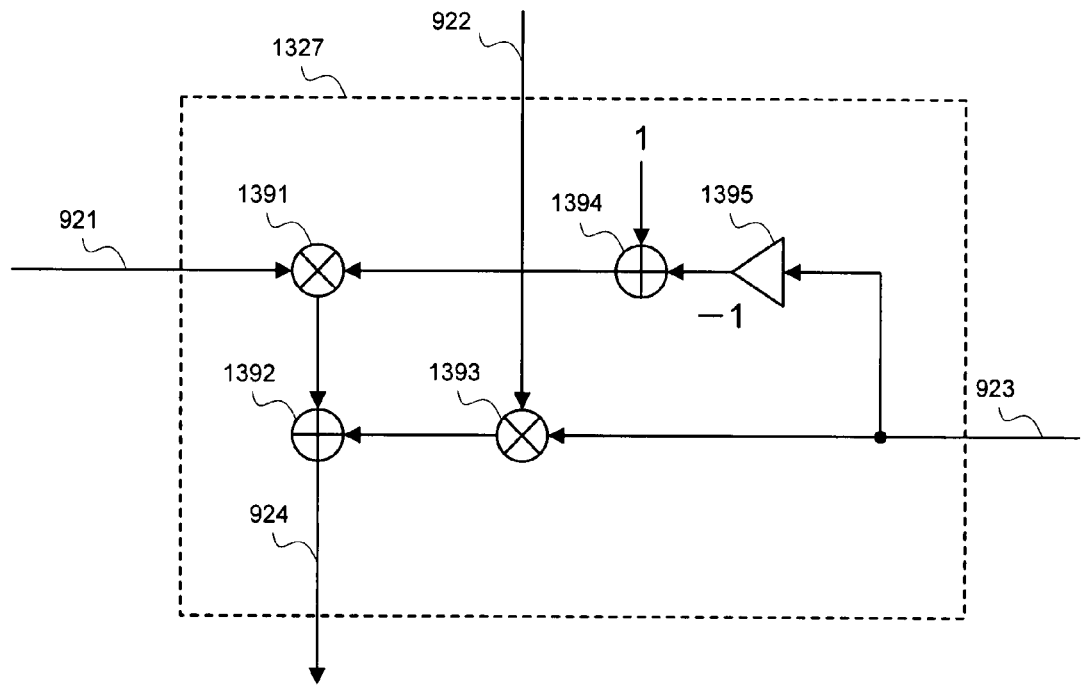
FIG. 9 A block diagram showing a configuration of a multiple weighted adding section contained in FIG. 8.

FIG. 9 is a block diagram showing a configuration of the weighted adding section 1327 contained in FIG. 8. The weighted adding section 1327 comprises multipliers 1391, 1393, a constant multiplier 1395, and adders 1392, 1394.

There are supplied as inputs an instantaneous estimated SNR 921 for each frequency band from the multiple limited-range processing section 1321 in FIG. 8, a past SNR 922 for each frequency band from the multiplier 1325 in FIG. 8, and a weight 923 from the weight storage section 1326 in FIG. 8. The weight 923 having a value of α is transferred to the constant multiplier 1395 and multiplier 1393. The constant multiplier 1395 multiplies the input signal by a factor of minus one, and transfers the resulting −α to the adder 1394. The other input to the adder 1394 is supplied with one, and the output of the adder 1394 is the sum of these, i.e., 1−α. 1−α is supplied to the multiplier 1391, and multiplied by the instantaneous estimated SNR $P[\gamma_n(k)-1]$ for each frequency band, which is the other input, and a product $(1-\alpha) P[\gamma_n(k)-1]$ is transferred to the adder 1392. On the other hand, at the multiplier 1393, α supplied as the weight 923 is multiplied with the past estimated SNR 922, and the product $\alpha G^2_{n-1}(k)$-bar $\gamma_{n-1}(k)$ is transferred to the adder 1392. The adder 1392 outputs a sum of $(1-\alpha) P[\gamma_n(k)-1]$ and $\alpha G^2_{n-1}(k)$-bar $\gamma_{n-1}(k)$ as an estimated prior SNR 924 for each frequency band.

Figure 10:
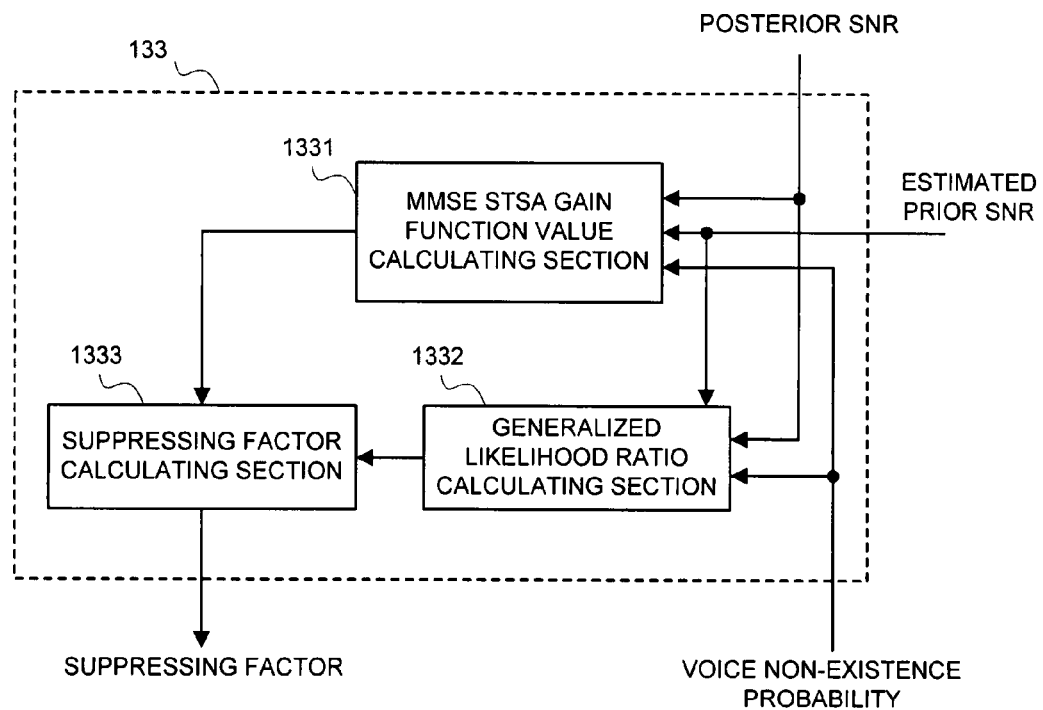
FIG. 10 A block diagram showing a configuration of a suppressing factor calculating section contained in FIG. 7.

FIG. 10 is a block diagram showing the suppressing factor generating section 133 contained in FIG. 7. The suppressing factor generating section 133 comprises an MMSE STSA gain function value calculating section 1331, a generalized likelihood ratio calculating section 1332, and a suppressing factor calculating section 1333. A method of calculating a suppressing factor will now be described with reference to a calculation formula described in Non-patent Document 4 (IEEE Transactions on Acoustics, Speech, and Signal Processing, Vol. 32, No. 6, pp. 1109-1121 (December 1984)).

A frame index is represented as n, a frequency index is represented as k, and $\gamma_n(k)$ is defined as a frequency-indexed posterior SNR supplied from the frequency-indexed SNR calculating section 131 in FIG. 7, $\xi_n(k)$-hat is defined as an frequency-indexed estimated prior SNR supplied from the estimated prior SNR calculating section 132 in FIG. 7, and q is defined as a voice non-existence probability supplied from the voice non-existence probability storage section 134 in FIG. 7.

Moreover, $\eta_n(k)=\xi_n(k)$-hat/(1−q), and $v_n(k)=(\eta_n(k)\gamma_n(k))/(1+\eta_n(k))$ are defined.

The MMSE STSA gain function value calculating section 1331 calculates an MMSE STSA gain function value independently for each frequency band based on the posterior SNR $\gamma_n(k)$ supplied from the frequency-indexed SNR calculating section 131 in FIG. 7, estimated prior SNR $\xi_n(k)$-hat supplied from the estimated prior SNR calculating section 132 in FIG. 7, and voice non-existence probability q supplied from the voice non-existence probability storage section 134 in FIG. 7, and outputs the function value to the suppressing factor calculating section 1333. The MMSE STSA gain function value $G_n(k)$ for each frequency band is given by:

$$G_n(k) = \frac{\sqrt{\pi}}{2} \frac{\sqrt{v_n(k)}}{\gamma_n(k)} \exp\left(-\frac{v_n(k)}{2}\right)\left[(1+v_n(k))I_0\left(\frac{v_n(k)}{2}\right) + v_n(k)I_1\left(\frac{v_n(k)}{2}\right)\right] \quad \text{[Equation 5]}$$

where $I_0(z)$ represents a zero-th order modified Bessel function, and $I_1(z)$ represents a first-order modified Bessel function. The modified Bessel function is described in Non-patent Document 5 (Iwanami Sugaku Ziten (Encyclopedic Dictionary of Mathematics), published by Iwanami Shoten (1985), p. 374.G).

The generalized likelihood ratio calculating section 1332 calculates a generalized likelihood ratio for each frequency band based on the posterior SNR $\gamma_n(k)$ supplied from the frequency-indexed SNR calculating section 131 in FIG. 7, estimated prior SNR $\hat{\xi}_n(k)$-hat supplied from the estimated prior SNR calculating section 132 in FIG. 7, and voice non-existence probability q supplied from the voice non-existence probability storage section 134 in FIG. 7, and transfers the ratio to the suppressing factor calculating section 1333. The generalized likelihood ratio $\Lambda_n(k)$ for each frequency band is given by:

$$\Lambda_n(k) = \frac{1-q}{q} \frac{\exp(v_n(k))}{1+\eta_n(k)} \quad \text{[Equation 6]}$$

The suppressing factor calculating section 1333 calculates a suppressing factor for each frequency from the MMSE STSA gain function value $G_n(k)$ supplied from the MMSE STSA gain function value calculating section 1331 and generalized likelihood ratio $\Lambda_n(k)$ supplied from the generalized likelihood ratio calculating section 1332, and outputs the suppressing factor to the suppressing factor correcting section 135 in FIG. 7. The suppressing factor $\overline{G_n(k)}$-bar for each frequency band is given by:

$$\overline{G_n}(k) = \frac{\Lambda_n(k)}{\Lambda_n(k)+1} G_n(k) \quad \text{[Equation 7]}$$

Figure 11:
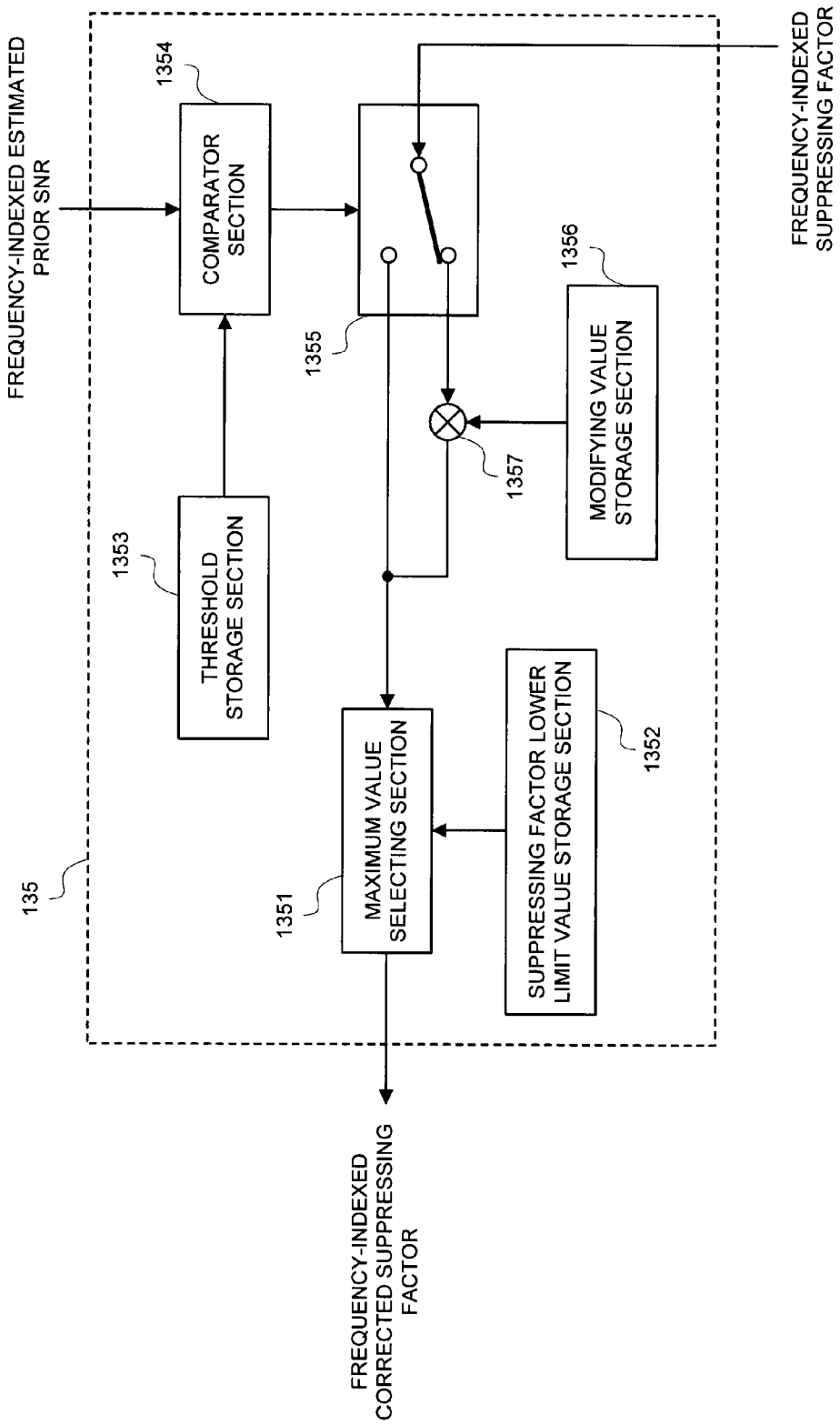
FIG. 11 A block diagram showing a configuration of a suppressing factor correcting section contained in FIG. 7.

FIG. 11 is a block diagram showing the suppressing factor correcting section 135 contained in FIG. 7. The suppressing factor correcting section 135 comprises a maximum value selecting section 1351, a suppressing factor lower limit value storage section 1352, a threshold storage section 1353, a comparator section 1354, a switch 1355, a modifying value storage section 1356, and a multiplier 1357 for each band. The comparator section 1354 compares a threshold supplied from the threshold storage section 1353 with the estimated prior SNR for frequency band supplied from the estimated prior SNR calculating section 132 in FIG. 7, and supplies to the switch 1355 zero when the estimated prior SNR for frequency band is greater than the threshold and one when it is smaller. The switch 1355 outputs the suppressing factor for each frequency band supplied from the suppressing factor calculating section 133 in FIG. 7 to the multiplier 1357 when the output value of the comparator section 1354 is one, and to the maximum value selecting section 1351 when the output value is zero. That is, correction on the suppressing factor is performed when the estimated prior SNR for frequency band is smaller than the threshold. The multiplier 1357 calculates a product of the output value of the switch 1355 and that of the modifying value storage section 1356, and transfers it to the maximum value selecting section 1351.

On the other hand, the suppressing factor lower limit value storage section 1352 supplies a stored lower limit value of the suppressing factor to the maximum value selecting section 1351. The maximum value selecting section 1351 compares the suppressing factor for each frequency band supplied from the suppressing factor calculating section 133 in FIG. 7 or the product calculated at the multiplier 1357 with the suppressing factor lower limit value supplied from the suppressing factor lower limit value storage section 1352, and outputs a larger one to the multiplier 14 in FIG. 1. That is, the suppressing factor always has a value larger than the lower limit value stored in the suppressing factor lower limit value storage section 1352.

According to the configuration shown in FIG. 1, since an impulse response from a signal source to an observation point is successively determined at the reverberation estimating section 30 to estimate reverberation generated by later reflection, dereverberated signals can be obtained with high quality. Moreover, reverberation is estimated by the reverberation estimating section 30, a noise is estimated by the noise estimating section 10, a mixed signal of the estimated reverberation and estimated noise is generated by the mixing section, and a suppressing factor is generated based on the mixed signal, so that noise suppression and dereverberation can be simultaneously achieved with a reduced amount of computation and with high quality.

Figure 12:
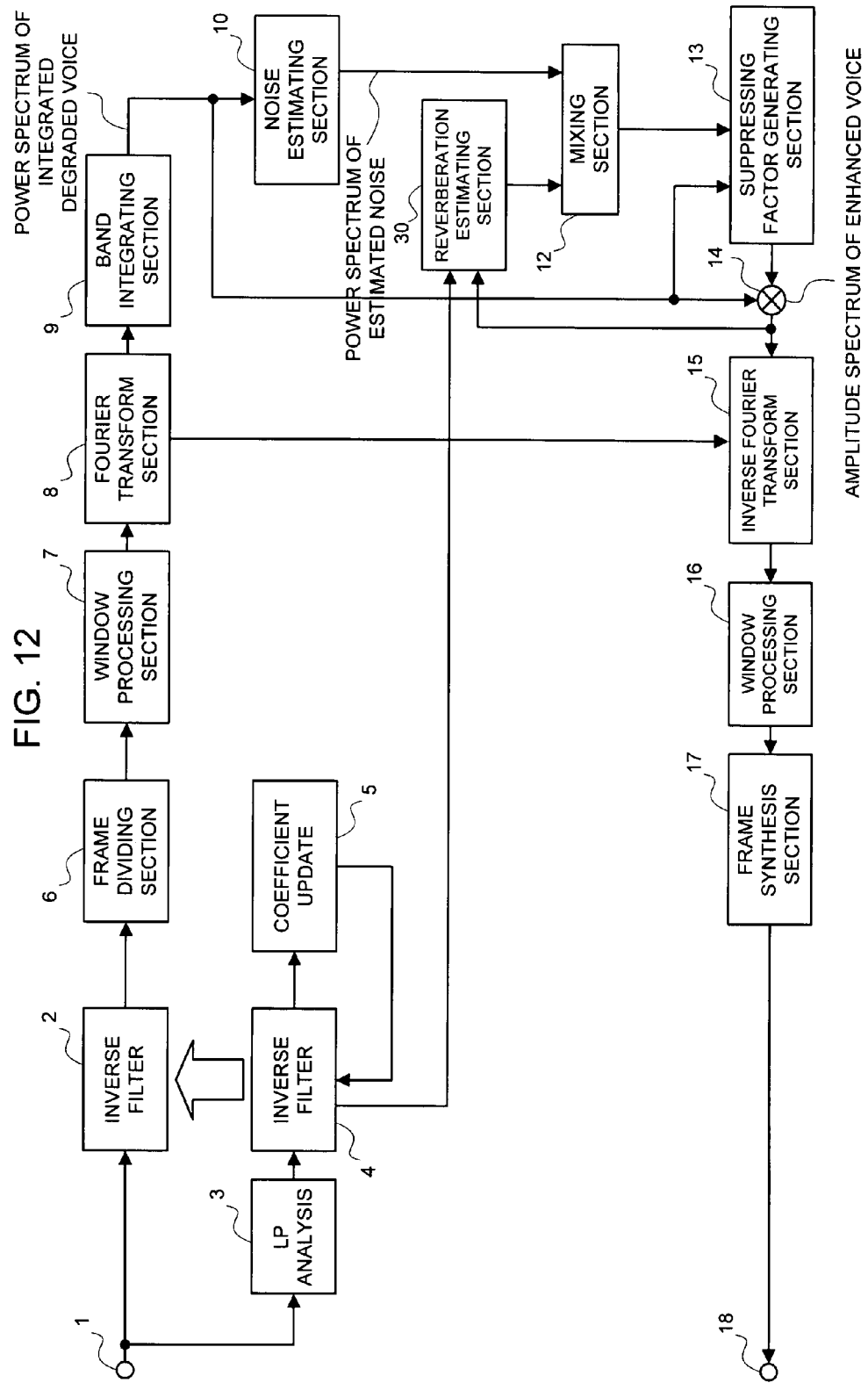
FIG. 12 A block diagram showing a second embodiment of the present invention.

FIG. 12 is a block diagram showing a second embodiment of the present invention. A difference thereof from FIG. 1 showing the first embodiment is in a band integrating section 9. The band integrating section 9 integrates signal samples corresponding to a plurality of frequency components to reduce the total number, and transfers the resulting samples to the noise estimating section 10, suppressing factor generating section 13, and multiplier 14. In the integration, a plurality of signal samples are summed up, and divided by the number of summed samples to give an average value.

Figure 13:
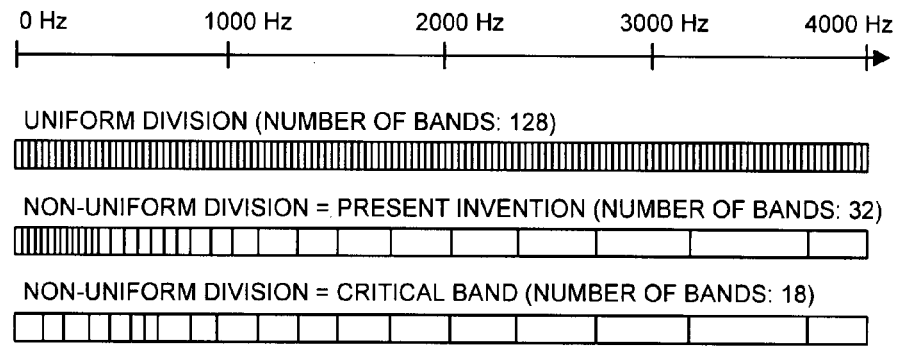
FIG. 13 A diagram for explaining integration of frequency samples.

FIG. 13 is a diagram for explaining the integration of a plurality of frequency samples in the band integrating section 9. There is shown a case of 8-kHz sampling, i.e., a case in which signals having a bandwidth of 4 kHz Fourier-transformed with a block length L. In the first embodiment of the present invention, the number of Fourier-transformed degraded voice signal samples that occur is equal to the block length L for Fourier transform. However, mutually independent samples thereof are half of them, or L/2. According to the second embodiment of the present invention, the L/2 samples are partially integrated to reduce the number of independent frequency components. At that time, a larger number of samples are integrated into one sample in a higher frequency region. Specifically, more frequency components are integrated into one for higher band components, resulting in non-uniform division. Examples of such non-uniform division include octave division in which the bandwidth is reduced with a power of two toward a lower band, and a critical band in which the band is divided based on the human auditory property. For details of the critical band, refer to Non-patent Document 6 ("Psychoakustik," Japanese translation published by Nishimura Shoten (1992)).

Especially, the band division according to the critical band is widely used because it matches well the human auditory property. In a 4-kHz band, the critical band is composed of a total of eighteen bands. On the other hand, as shown in FIG. 13, the second embodiment of the present invention divides the band into smaller bands than in the critical band especially in a lower band to prevent degradation of sound quality. While the same band division as that in the critical band is employed for a frequency higher than 1156 Hz up to 4 kHz, the band is divided into smaller bands in a lower band, which characterizes the technique. FIG. 13 shows a case of L=256. Individual bands from direct current to a thirteenth frequency component are independently processed as are without integration. Fourteen subsequent components are grouped by two and integrated into seven groups. Six subsequent components are grouped by three and integrated into two groups. Thereafter, every set of four components is integrated into one group, and the following components are integrated to conform with the critical band. By thus integrating the frequency components, the number of independent frequency components can be reduced from 128 to 32. Correspondence of 128 frequency components after Fourier transform to 32 integrated frequency components is shown in Table 1. Since $4000/128=31.25$ Hz is assigned per frequency component, corresponding frequencies calculated using this are tabulated in the rightmost column.

In operation of the band integrating section 9, it is important that no integration of the frequency components is made for a frequency lower than about 400 Hz. Integration of frequency components in this frequency range deteriorates resolution, leading to degradation of sound quality. On the other hand, a frequency higher than about 1156 Hz, frequency components may be integrated according to the critical band. Moreover, as the band of input signals becomes broader, the block length L for Fourier transform should be increased to keep sound quality. This is because, in the aforementioned band without integration of frequency components in a band of 400 Hz or lower, a band per frequency component is extended and resolution is deteriorated. For example, assuming L=256 and a band of 4 kHz as reference, the block length L for Fourier transform is determined as L>fs/31.25, whereby sound quality for broadband signals can be kept at a similar level to that in a 4-kHz band. Following this law, L is selected as a power of two, and L=512 for 8 kHz<fs≦16 kHz, L=1024 for 16 kHz<fs≦32 kHz, and L=2048 for 32 kHz<fs≦64 kHz. An example of fs=16 kHz corresponding to Table 1 is shown in Table 2. Table 2 is provided by way of example, and a slight modification on the borders for band integration offers a similar effect.

An integrated power spectrum of degraded voice for each integrated frequency band is supplied to the noise estimating section 10, suppressing factor generating section 13, and multiplier 14. The reverberation estimating section 30 also estimates reverberation for each frequency band integrated in a pattern shown in FIG. 13, and supplies it to the mixing section 12. The mixing section 12 mixes the estimated noise and estimated reverberation for each integrated band, and supplies the result to the suppressing factor generating section 13. The suppressing factor generating section 13 calculates a suppressing factor for a mixed signal of reverberation and a noise in the integrated band, and supplies it to the multiplier 14. The multiplier 14 multiplies the input spectrum of degraded voice by the suppressing factor, and transfers the result to the inverse Fourier transform section 15 as an amplitude spectrum of enhanced voice.

Figure 14:
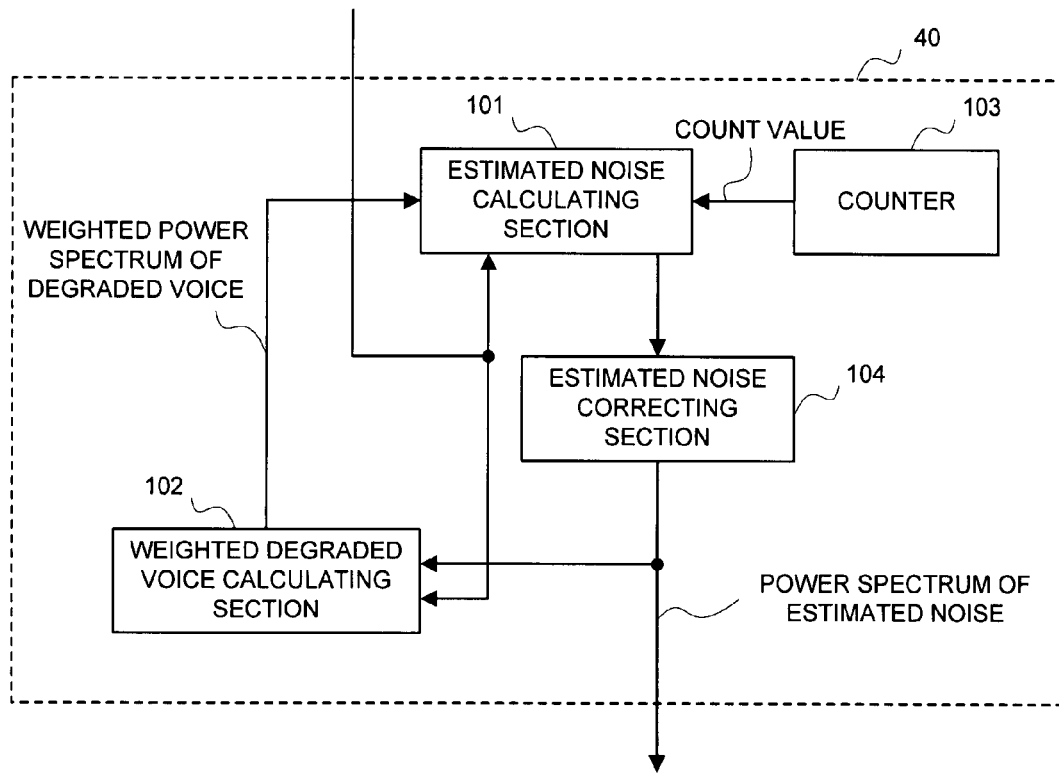
FIG. 14 A block diagram showing a configuration of a reverberation estimating section contained in a third embodiment of the present invention.

In accordance with a third embodiment of the present invention, it is possible to make a configuration in which the noise estimating section 10 in FIG. 12 representing the second embodiment is replaced with a noise estimating section 40. FIG. 14 is a block diagram showing the noise estimating section 40 contained in the third embodiment of the present invention. A difference thereof from the noise estimating section 10 contained in the first and second embodiments is in an estimated noise correcting section 104. The estimated noise correcting section 104 corrects the estimated noise supplied from the estimated noise calculating section 101, and transfers the result to the mixing section 12 in FIG. 1 as a power spectrum of an estimated noise. The most basic operation of the correction in the estimated noise correcting section 104 is multiplication of all frequency components with the same constant. It is also possible to vary the constant for each frequency. A special case thereof is a process of defining the constant as 1.0 for a specific frequency, wherein no correction is made on data at a frequency to which the constant 1.0 is applied, while correction is made on data at other frequencies. That is, frequency-selective correction can be made. Besides, correction involving adding a different value for each frequency, or performing non-linear processing, or the like may be contemplated. By such correction, it is possible to reduce an offset of the estimated noise value from a true value caused by band integration, and keep high sound quality for the output enhanced voice. In a case of reverberation of zero, it has been revealed in non-formal subjective evaluation that in 8-kHz sampling, an estimated noise in a band higher than about 1000 Hz is suitably multiplied by a constant of 0.7.

TABLE 1

Sub-band Generation by Non-uniform Division in Integration of Frequency Components (fs = 8 kHz)

| Band index | Frequency component index (No. of components) | Frequency [Hz] |
|---|---|---|
| 0 | 0 (1) | 0-31 |
| 1 | 1 (1) | 31-62 |
| ... | ... | ... |
| 12 | 12 (1) | 375-406 |
| 13 | 13-14 (2) | 406-469 |
| 14 | 15-16 (2) | 469-531 |
| 15 | 17-18 (2) | 531-594 |
| 16 | 19-20 (2) | 594-656 |
| 17 | 21-22 (2) | 656-719 |
| 18 | 23-24 (2) | 719-781 |
| 19 | 25-26 (2) | 781-844 |
| 20 | 27-29 (3) | 844-938 |
| 21 | 30-32 (3) | 938-1031 |
| 22 | 33-36 (4) | 1031-1156 |
| 23 | 37-42 (6) | 1156-1344 |
| 24 | 43-48 (6) | 1344-1531 |
| 25 | 49-56 (8) | 1531-1781 |
| 26 | 57-65 (9) | 1781-2063 |
| 27 | 66-75 (10) | 2063-2375 |
| 28 | 76-87 (12) | 2375-2750 |
| 29 | 88-101 (14) | 2750-3188 |
| 30 | 102-119 (18) | 3188-3750 |
| 31 | 120-128 (9) | 3750-4000 |

TABLE 2

Sub-band Generation by Non-uniform Division in Integration of Frequency Components (fs = 16 kHz)

| Band index | Frequency component index (No. of components) | Frequency [Hz] |
|---|---|---|
| 0 | 0 [1] | 0-31 |
| 1 | 1 [1] | 31-62 |
| ... | ... | ... |
| 12 | 12 [1] | 375-406 |
| 13 | 13-14 [2] | 406-469 |
| 14 | 15-16 [2] | 469-531 |
| 15 | 17-18 [2] | 531-594 |
| 16 | 19-20 [2] | 594-656 |
| 17 | 21-22 [2] | 656-719 |
| 18 | 23-24 [2] | 719-781 |
| 19 | 25-26 [2] | 781-844 |
| 20 | 27-29 [3] | 844-938 |
| 21 | 30-32 [3] | 938-1031 |
| 22 | 33-36 [4] | 1031-1156 |
| 23 | 37-42 [6] | 1156-1344 |
| 24 | 43-48 [6] | 1344-1531 |
| 25 | 49-56 [8] | 1531-1781 |
| 26 | 57-65 [9] | 1781-2063 |
| 27 | 66-75 [10] | 2063-2375 |
| 28 | 76-87 [12] | 2375-2750 |
| 29 | 88-101 [14] | 2750-3188 |
| 30 | 102-119 [18] | 3188-3750 |
| 31 | 119-140 [21] | 3750-4406 |
| 32 | 140-169 [29] | 4406-5313 |
| 33 | 169-204 [35] | 5313-6406 |
| 34 | 204-245 [41] | 6406-7688 |
| 35 | 245-255 [10] | 7688-8000 |

Figure 15:
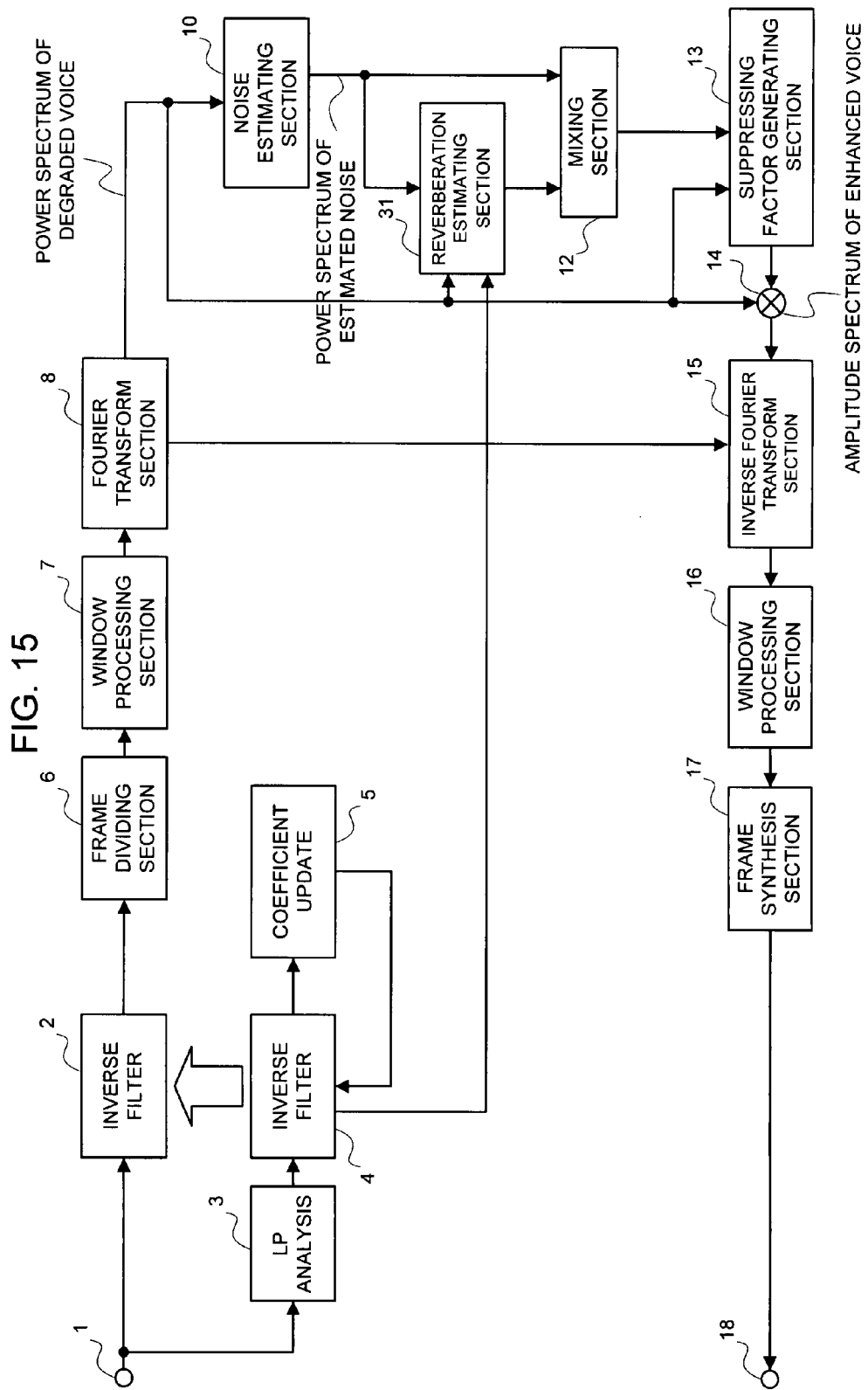
FIG. 15 A block diagram showing a fourth embodiment of the present invention.

FIG. 15 is a block diagram showing a fourth embodiment of the present invention. A difference thereof from FIG. 1 showing the first embodiment is in a reverberation estimating section 31. The reverberation estimating section 31 is supplied with degraded voice and an estimated noise output by the noise estimating section 10, in place of past enhanced voice. The reverberation estimating section 31 uses the estimated noise supplied from the noise estimating section to estimate reverberation after reducing an effect of a noise in degraded voice.

Figure 16:
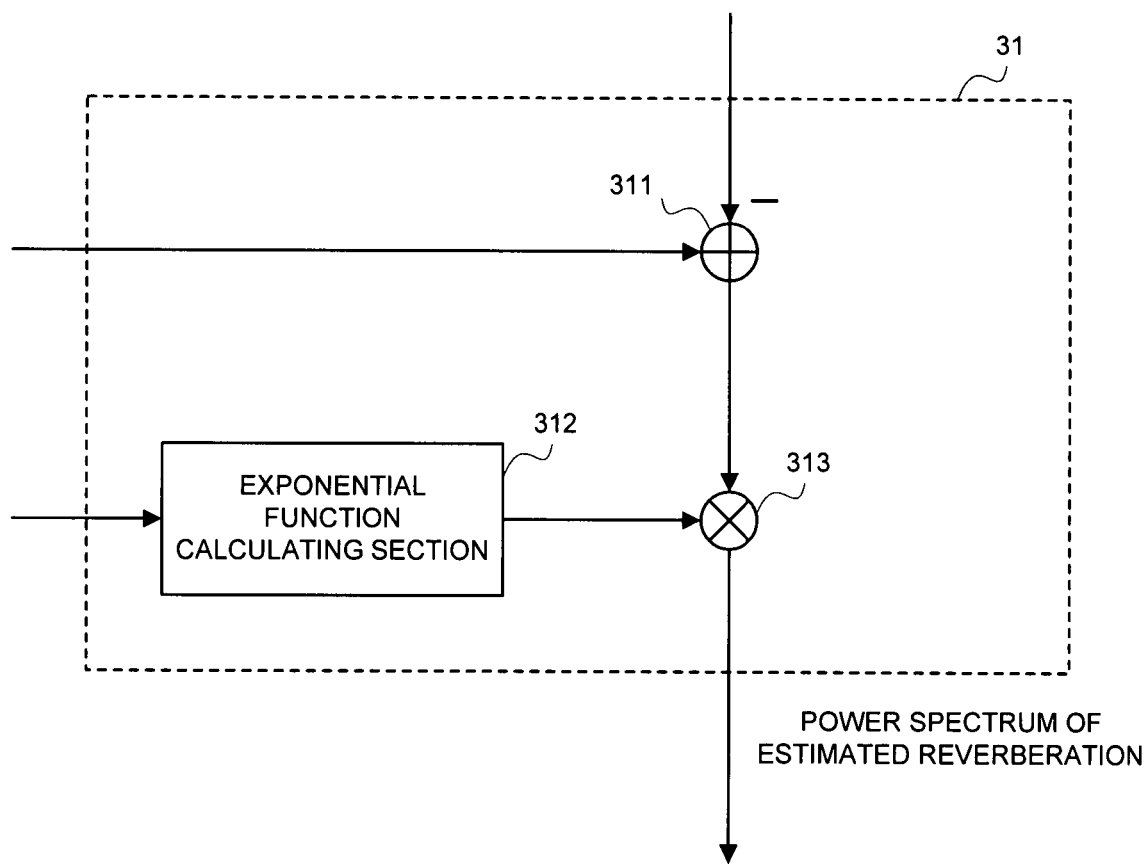
FIG. 16 A block diagram showing a configuration of a reverberation estimating section contained in the fourth embodiment of the present invention.

FIG. 16 is a block diagram showing an embodiment of the reverberation estimating section 31. The reverberation estimating section 31 comprises a subtractor 311, an exponential function calculating section 312, and a multiplier 313. The estimated noise supplied from the noise estimating section 10 in FIG. 15 is supplied to the subtractor 311. The subtractor 311 is also supplied with a power spectrum of degraded voice from the Fourier transform section 8 in FIG. 15, and a result of subtraction of the power spectrum of an estimated noise therefrom is transferred to the multiplier 313. On the other hand, the filter coefficients supplied from the inverse filter 4 are supplied to the exponential function calculating section 312. The exponential function calculating section 312 uses information on the filter coefficients supplied from the inverse filter 4 to estimate an exponential function corresponding to the later reflection components. Moreover, the exponential function calculating section 312 shifts the resulting exponential function by a predetermined number of samples, and transfers the shifted exponential function to the multiplier 313. The multiplier 313 calculates a product of the output of the subtractor 311 and the shifted exponential function as a power spectrum of estimated reverberation. The calculated power spectrum of estimated reverberation is supplied to the mixing section 12 in FIG. 15. The estimation of reverberation in the exponential function calculating section 312 and multiplier 313 is described in detail in Non-patent Document 7 (IEEE Proceedings of International Conference on Acoustics, Speech, and Signal Processing, pp. 173-176 (March 2005)).

Since in the fourth embodiment, the reverberation estimating section 31 uses the power spectrum of degraded voice in which an effect of an estimated noise is eliminated to estimate reverberation, it is possible to accurately estimate reverberation, thus improving quality of enhanced voice.

Figure 17:
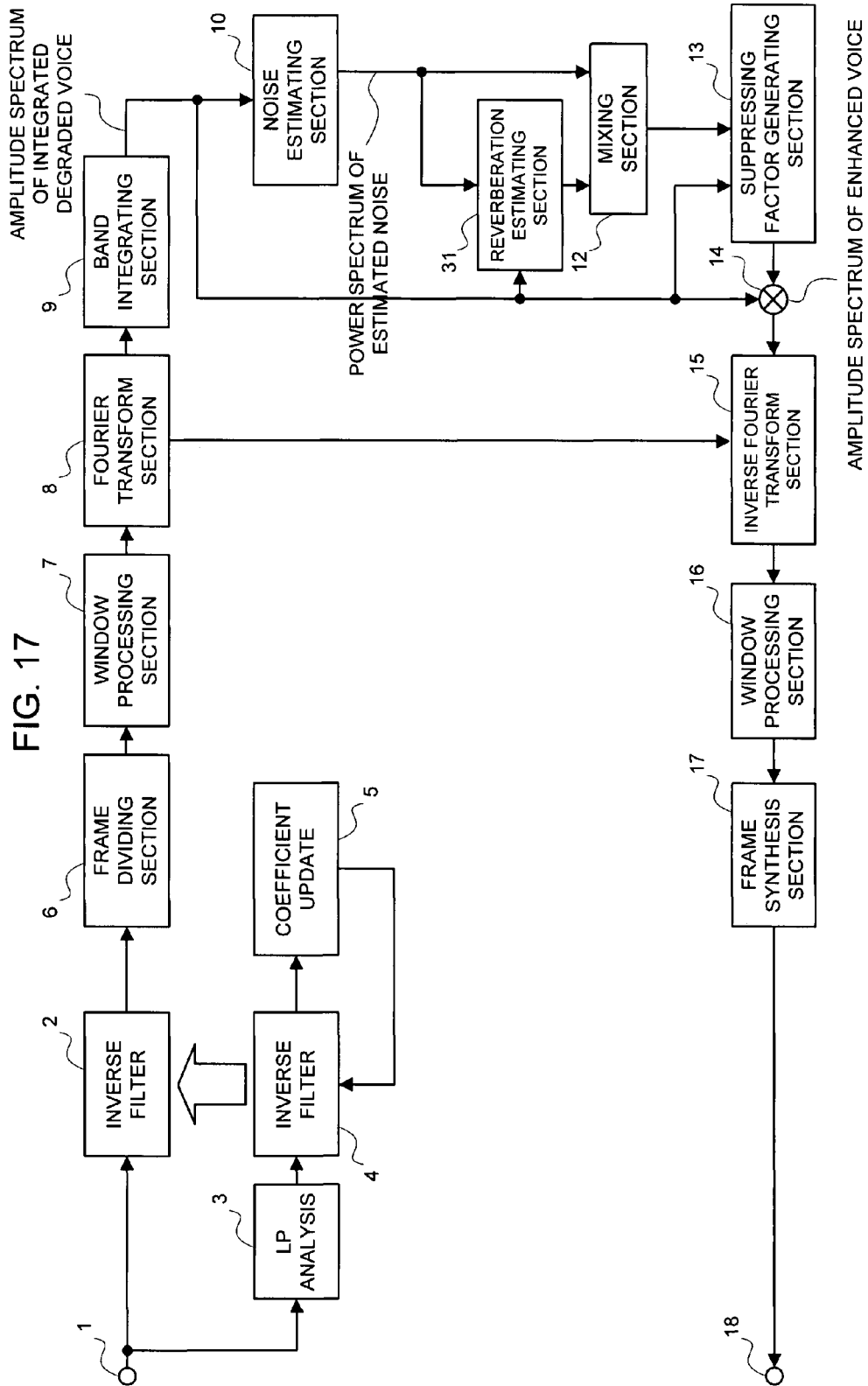
FIG. 17 A block diagram showing a fifth embodiment of the present invention.

FIG. 17 is a block diagram showing a fifth embodiment of the present invention. The relationship between the fourth and fifth embodiments is similar to that between the first and second embodiments, in which the presence of the band integrating section 9 constitutes a difference. The operation of the band integrating section 9 has been described in the explanation regarding the second embodiment, and it is omitted here.

Figure 18:
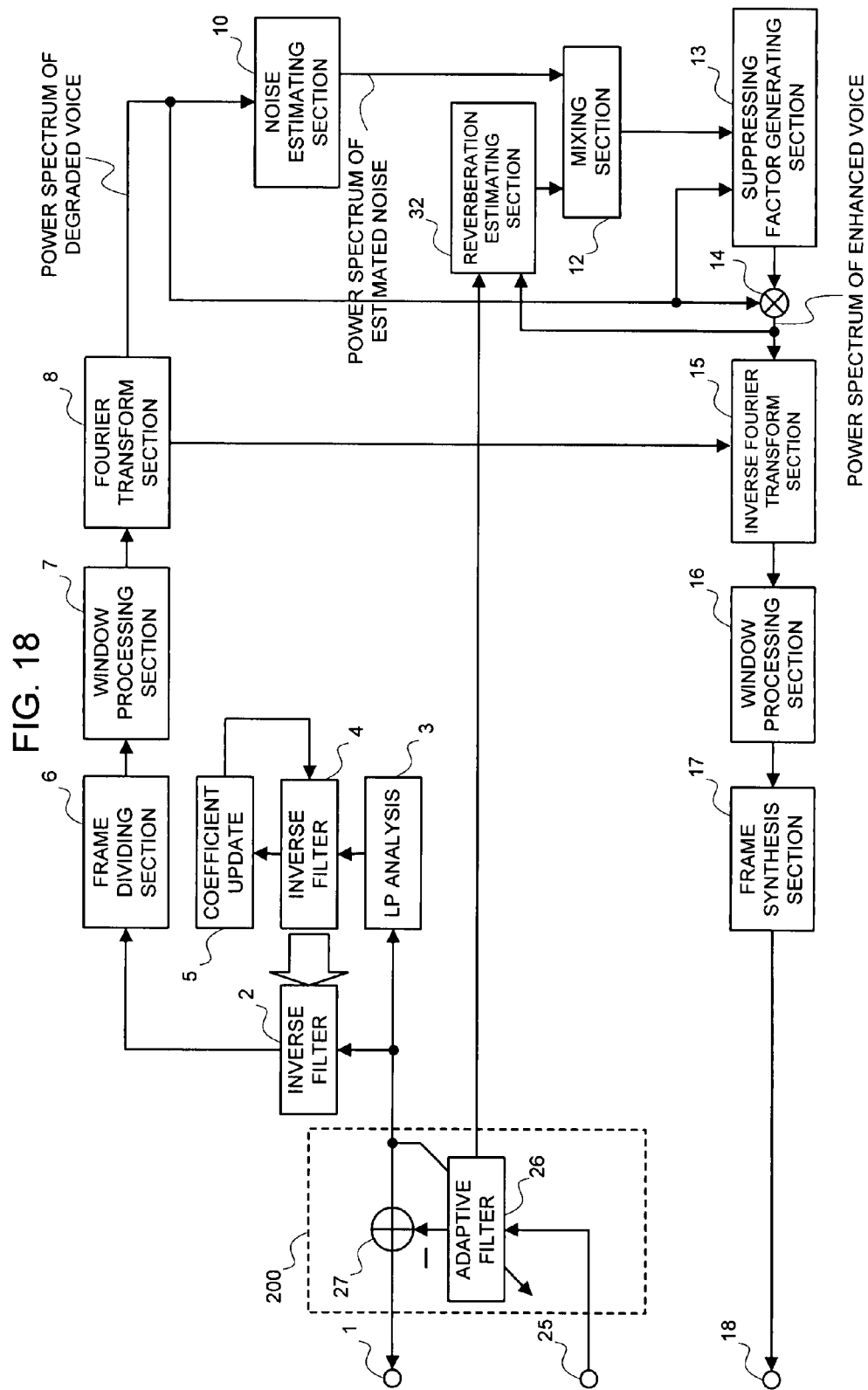
FIG. 18 A block diagram showing a sixth embodiment of the present invention.

FIG. 18 is a block diagram showing a sixth embodiment of the present invention. The sixth embodiment is concatenated with a double-input noise canceller 200 on the input side of the first embodiment. Coefficients of an adaptive filter 26, which is the main component of the double-input noise canceller 200, are supplied to the reverberation estimating section 32. The reverberation estimating section 32 uses an impulse response thereof to estimate reverberation according to a similar procedure to that in the reverberation estimating section 30. The double-input noise canceller 200 comprises at least the adaptive filter 26 and a subtractor 27. A second input terminal 25 is supplied with a signal having correlation with a noise component contained in degraded voice supplied to the first input terminal 1. A signal supplied to the input terminal 25 is transferred to the adaptive filter 26, which outputs a result of convolution thereof with the coefficients. The output result of convolution is supplied to the subtractor 27. On the other hand, the other input of the subtractor 27 is supplied with the degraded voice. The subtractor 27 subtracts the output of the adaptive filter 26 from the degraded voice, and outputs the result as a noise-cancelled signal. The coefficients of the adaptive filter 26 are updated using the output of the subtractor 27 so that the output signals of the subtractor 27 are minimized according to a certain criterion. For the criterion for minimization, a technique using a mean squares instantaneous power is known as LMS algorithm, and that using an accumulated squared power is known as LS algorithm. The thus-optimized coefficients of the adaptive filter 26 are known to approximate an impulse response from an observation point of a signal supplied to the input terminal 25 to an observation point of a signal supplied to the input terminal 1. Therefore, the output of the adaptive filter 26 approximates a noise component in signals supplied to the input terminal 1, and signals in which a noise is cancelled can be obtained at the output of the subtractor 27. As can be clearly seen from the foregoing description, the coefficients of the adaptive filter 26 approximate an impulse response of an environment in which the dereverberation apparatus of the present invention is employed, and they can be used to estimate reverberation at the reverberation estimating section 32.

In the first embodiment, the reverberation estimating section 30 determines an impulse response based on an inverse property of the impulse response from a signal source to an observation point supplied from the inverse filter 4. In the sixth embodiment, the impulse response itself is directly supplied to the reverberation estimating section 32 from the adaptive filter 26 that is the main component of the double-input noise canceller 200. The reverberation estimating section 32 uses the impulse response to estimate reverberation according to a similar procedure to that in the reverberation estimating section 30. Moreover, as described in the first embodiment, the number of coefficients employed may be any value of two or more, and coefficient averaging is still effective. It should be noted that an acoustic echo canceller may be employed in place of the double-input noise canceller 200. This is because the acoustic echo canceller contains therein an adaptive filter for identifying an acoustic property from a speaker to a microphone. By supplying the coefficients of the adaptive filter to the reverberation estimating section 32, reverberation can be estimated by a quite similar procedure to that in the double-input noise canceller. For a similar reason, a similar effect can be obtained by using part or all of the adaptive filter coefficients or an average thereof in a multi-input canceller section in a microphone array, in place of the double-input noise canceller 200.

While in the sixth embodiment, description has been made on concatenation of the double-input noise canceller with the configuration of the first embodiment, concatenation of the double-input noise canceller with the configuration of any one of the second through fifth embodiments provides a similar effect. Likewise, an acoustic echo canceller or a microphone array may be also employed there in place of the double-input noise canceller.

While in all the embodiments described thus far, a least mean squares error short-term spectrum amplitude method is assumed for a suppressing section having the suppressing factor generating section 13 as main component, other methods may be applied. Examples of such methods include a Wiener filter technique disclosed in Non-patent Document 8 (Proceedings of the IEEE, Vol. 67, No. 12, pp. 1586-1604 (December 1979)), and a spectrum subtraction technique disclosed in Non-patent Document 9 (IEEE Transactions on Acoustics, Speech, and Signal Processing, Vol. 27, No. 2, pp. 113-120 (April 1979)); however, detailed description of their configurations is omitted here.

Figure 19:
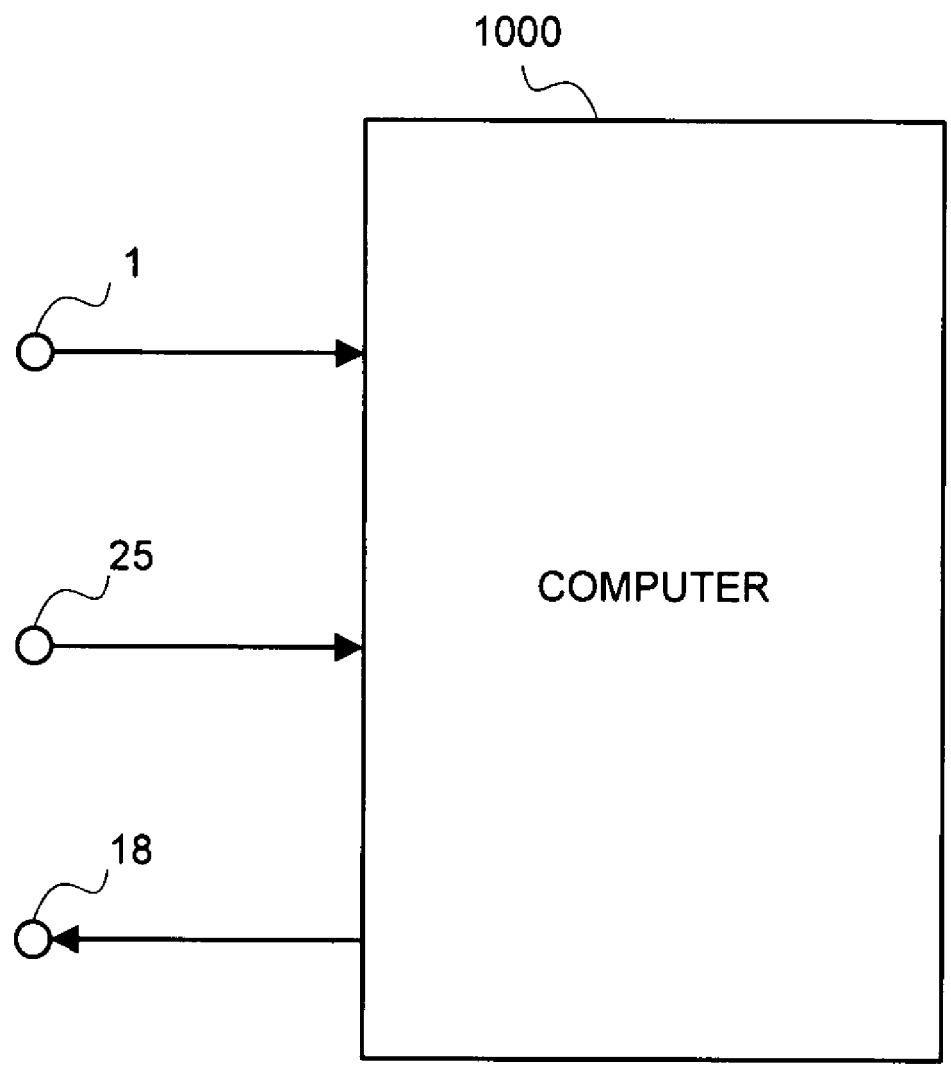
FIG. 19 A block diagram showing a seventh embodiment of the present invention.

FIG. 19 is a block diagram showing a seventh embodiment of the present invention. The seventh embodiment of the present invention is comprised of a computer (central processing apparatus; processor; data processing apparatus) 1000 operated by program control, the input terminals 1 and 25, and the output terminal 18.

The computer (central processing apparatus; processor; data processing apparatus) 1000 comprises the noise estimating section 10, reverberation estimating section 30, mixing section 12, suppressing factor generating section 13, multiplier 14, and noise canceller 200. It may comprise the reverberation estimating section 31 or 32 in place of the reverberation estimating section 30, or may comprise the noise estimating section 40 in place of the noise estimating section 10.

Degraded voice supplied to the input terminals 1 and 25 is supplied to the noise canceller in the computer 1000, where a noise is cancelled. The noise-cancelled signal is used to estimate reverberation contained at the reverberation estimating section 30 and a noise left from the cancellation at the noise estimating section 10. In estimating reverberation, coefficient values of the adaptive filter 26 contained in the noise canceller 200 are employed. These estimated signals are mixed at the mixing section 12, and supplied to the suppressing factor generating section 13. The suppressing factor generating section generates appropriate suppressing factors from mixed signals of the supplied estimated noise and estimated reverberation. The generated suppressing factors are employed by the multiplier 14 to perform dereverberation and suppression of a noise left from the cancellation, and supply the resulting signals to the output terminal 18. It is also possible to make a configuration employing an inverse filter that maximizes the kurtosis of a residual error from linear prediction of degraded voice supplied from the input terminal 1, rather than using the noise canceller 200. In such a case, the input terminal 25 is not needed. Moreover, it is possible to make a configuration in which an echo canceller or a microphone array is employed in combination, in place of the noise canceller 200.

Since the present invention is configured to use an impulse response from a signal source to an observation point in reverberation estimation, accurate reverberation estimation is enabled and effective dereverberation can be performed. Moreover, since the present invention is configured to perform estimation of reverberation and a noise, appropriately mix them, and then suppress them, dereverberation and suppression of a noise can be simultaneously achieved with a reduced amount of computation.

The invention claimed is:

1. A dereverberation method comprising:
   converting an input signal into a frequency-domain signal;
   estimating a noise using said frequency-domain signal;
   estimating reverberation using an impulse response from a signal source to an observation point, and past enhanced voice;
   obtaining a mixed signal by mixing said estimated noise and said estimated reverberation;
   determining a suppressing factor using said mixed signal and said frequency-domain signal; and
   performing dereverberation by weighting said frequency-domain signal with said suppressing factor.

2. A dereverberation method according to claim 1, wherein the reverberation is estimated by using, in place of said past enhanced voice, said estimated reverberation in which an effect of said estimated noise is removed, and said frequency-domain signal.

3. A dereverberation method according to claim 1, wherein said suppressing factor is obtained by integrating bands of said frequency-domain signal to obtain an integrated frequency-domain signal, and using said integrated frequency-domain signal in place of said frequency-domain signal.

4. A dereverberation method according to claim 1, further comprising:
   removing correlation between input signal samples to obtain a correlation-removed signal;
   processing said correlation-removed signal with an adaptive filter to obtain a provisionary early reflection-suppressed signal;
   updating coefficients of said adaptive filter so that kurtosis of said provisionary early reflection-suppressed signal is maximized;
   processing said input signal with a fixed filter having the same coefficients as those of said adaptive filter to obtain an early reflection-removed signal;
   determining said impulse response using the coefficients of said adaptive filter; and
   employing said early reflection-removed signal as said input signal.

5. A dereverberation method according to claim 1, further comprising:
   processing a reference signal with a first adaptive filter to obtain a pseudo-noise;
   subtracting said pseudo-noise from an input signal to obtain a noise-cancelled signal;
   updating coefficients of said first adaptive filter using said noise-removed signal and said reference signal so that said noise-removed signal is minimized;
   obtaining said impulse response using the coefficients of said first adaptive filter; and
   employing said noise-removed signal as said input signal.

6. A dereverberation method according to claim 5, further comprising:
   removing correlation between samples of said noise-removed signal to obtain a correlation-removed signal;
   processing said correlation-removed signal with a second adaptive filter to obtain a provisionary early reflection-suppressed signal;
   updating coefficients of said second adaptive filter so that kurtosis of said provisionary early reflection-suppressed signal is maximized;
   processing said input signal with a fixed filter having the same coefficients as those of said second adaptive filter to obtain an early reflection-removed signal;
   obtaining said impulse response using the coefficients of said first adaptive filter; and
   employing said early reflection-removed signal as said input signal.

7. A dereverberation apparatus comprising:
   a converting section for converting an input signal into a frequency-domain signal;
   a noise estimating section for obtaining an estimated noise using said frequency-domain signal;
   a reverberation estimating section for estimating reverberation using an impulse response from a signal source to an observation point, and past enhanced voice;
   a mixing section for mixing said estimated noise and said estimated reverberation to obtain a mixed signal;
   a suppressing factor generating section for determining a suppressing factor using said mixed signal and said frequency-domain signal; and
   a multiplying section for weighting said frequency-domain signal with said suppressing factor.

8. A dereverberation apparatus according to claim 7, further comprising a reverberation estimating section for estimating reverberation using, in place of said past enhanced voice, said estimated reverberation in which an effect of said estimated noise is removed, and said frequency-domain signal.

9. A dereverberation apparatus according to claim 7 further comprising a band integrating section for integrating bands of said frequency-domain signal to obtain an integrated frequency-domain signal, and said suppressing factor is obtained by using said integrated frequency-domain signal in place of said frequency-domain signal.

10. A dereverberation apparatus according to claim 7, further comprising:

a correlation-removing section for removing correlation between input signal samples to obtain a correlation-removed signal;

an adaptive filter for processing said correlation-removed signal to obtain a provisionary early reflection-suppressed signal;

a fixed filter for processing said input signal with the same coefficients as those of said adaptive filter to obtain an early reflection-removed signal;

a reverberation estimating section for obtaining said impulse response using the coefficients of said adaptive filter; and the coefficients of said adaptive filter are updated so that kurtosis of said provisionary early reflection-suppressed signal is maximized, and said early reflection-suppressed signal is employed as said input signal.

11. A dereverberation apparatus according to claim 7, further comprising:

a first adaptive filter for processing a reference signal to obtain a pseudo-noise;

a subtractor for subtracting said pseudo-noise from an input signal to obtain a noise-cancelled signal;

a reverberation estimating section for obtaining said impulse response using coefficients of said first adaptive filter; and the coefficients of said first adaptive filter are updated using said noise-removed signal and said reference signal so that said noise-removed signal is minimized, and said noise-removed signal is employed as said input signal.

12. A dereverberation apparatus according to claim 11, further comprising:

a correlation-removing section for removing correlation between samples of said noise-removed signal to obtain a correlation-removed signal;

a second adaptive filter for processing said correlation-removed signal to obtain a provisionary early reflection-suppressed signal;

a fixed filter for processing said input signal with the same coefficients as those of said second adaptive filter to obtain an early reflection-removed signal;

a reverberation estimating section for obtaining said impulse response using the coefficients of said first adaptive filter; and the coefficients of said second adaptive filter are updated so that kurtosis of said provisionary early reflection-suppressed signal is maximized, and said early reflection-suppressed signal is employed as said input signal.

13. A non-transitory computer readable medium storing a program for dereverberation for causing a computer to execute the processing of:

converting an input signal into a frequency-domain signal;

estimating a noise using said frequency-domain signal;

estimating reverberation using an impulse response from a signal source to an observation point, and past enhanced voice;

mixing said estimated noise and said estimated reverberation to obtain a mixed signal;

determining a suppressing factor using said mixed signal and said frequency-domain signal; and weighting said frequency-domain signal with said suppressing factor.

14. A non-transitory computer readable medium storing a program for dereverberation for causing a computer to execute the processing of:

converting an input signal into a frequency-domain signal;

estimating a noise using said frequency-domain signal;

estimating reverberation using an impulse response from a signal source to an observation point, said estimated reverberation in which an effect of said estimated noise is removed, and said frequency-domain signal;

mixing said estimated noise and said estimated reverberation to obtain a mixed signal;

determining a suppressing factor using said mixed signal and said frequency-domain signal; and weighting said frequency-domain signal with said suppressing factor.

* * * * *